United States Patent [19]

Ubukata et al.

[11] Patent Number: 5,416,599
[45] Date of Patent: May 16, 1995

[54] MAGNETIC VIDEO SIGNAL REPRODUCING APPARATUS WITH CORRECTION OF PHASE ROTATION

[75] Inventors: Tsuneo Ubukata, Yokohama; Hiroshi Takeshita, Ebina, both of Japan

[73] Assignee: Victor Company of Japan, Ltd., Yokohama, Japan

[21] Appl. No.: 15,026

[22] Filed: Feb. 5, 1993

[30] Foreign Application Priority Data

Feb. 5, 1992 [JP] Japan .................................. 4-054341

[51] Int. Cl.⁶ ............................................. H04N 9/89
[52] U.S. Cl. ................................... 358/320; 358/316; 358/324; 358/326
[58] Field of Search ................ 358/310, 320, 318, 324, 358/316, 326, 314, 339; H04N 9/79, 9/89; 348/662, 450

[56] References Cited

U.S. PATENT DOCUMENTS

| | | |
|---|---|---|
| 3,749,835 | 7/1973 | Arimura et al. ..................... 358/326 |
| 4,400,742 | 8/1983 | Yamamitsu et al. ................. 358/318 |
| 4,688,102 | 8/1987 | Edakubo et al. ..................... 358/310 |
| 4,689,695 | 8/1987 | Urata .................................. 358/314 |
| 4,698,694 | 10/1987 | Tomita et al. ........................ 358/326 |
| 4,700,239 | 10/1987 | Yoshinaka et al. .................. 358/310 |
| 4,719,519 | 1/1988 | Ide et al. ............................. 358/310 |
| 4,754,340 | 6/1988 | Nakagawa et al. .................. 358/326 |
| 4,807,048 | 2/1989 | Yasuda . | |
| 5,233,433 | 8/1993 | Suesada et al. ..................... 358/310 |

*Primary Examiner*—Tommy P. Chin
*Assistant Examiner*—Huy Nguyen
*Attorney, Agent, or Firm*—Jacobson, Price, Holman & Stern

[57] ABSTRACT

An apparatus for reproducing video signals from a magnetic recording medium using first and second magnetic heads mutually having different azimuth angles. Here, the video signal is obtained by frequency-multiplexing of a low frequency-converted chrominance signal which is obtained by converting into a low frequency range and phase rotation of a chrominance signal per horizontal scanning period, and a modulated luminance signal, and recorded in the magnetic recording medium. One of video signals picked up by the magnetic heads is selected to obtain a chain of reproduced video signal. Discontinuity is detected if there is in the phase rotation of the low frequency-converted chrominance signal in the reproduced video signal. The low frequency-converted chrominance signal in the reproduced video signal is reconverted into a high frequency range chrominance signal having no phase rotation. The phase rotation of the low frequency-converted chrominance signal in the reproduced video signal is forcibly corrected when the discontinuity is detected in the phase rotation.

2 Claims, 20 Drawing Sheets

MAGNETIC VIDEO SIGNAL REPRODUCING APPARATUS WITH CORRECTION OF PHASE ROTATION

BACKGROUND OF THE INVENTION

1. Field of the Invention

The present invention relates to a magnetic video signal reproducing apparatus which can magnetically record and reproduce video signals.

2. Description of the Prior Art

An example of prior art magnetic video signal reproducing apparatus will be described hereinbelow with reference to FIGS. 1A and 1B to FIG. 6.

In the prior art video signal reproducing apparatus (e.g. video tape recorder) as shown in FIG. 1A, a magnetic tape TT is obliquely wound around about a half of the circumference of a rotating drum X and further moved in the travel direction (the arrow direction) TT1. In addition, the rotating drum X is rotated in the clockwise direction (the arrow direction) X1, in order to reproduce video signals with the selective use of two first and second magnetic heads H1 and H2 provided with two different azimuth angles with respect to each other and arranged so as to be opposed at an angle of 180 degrees on the rotating drum X.

In the case where the magnetic tape TT is moved for high speed video signal reproduction at a speed higher than the ordinary magnetic tape travel speed, video signals are reproduced with the use of other two third and fourth magnetic heads H3 and H4 also provided with two different azimuth angles with respect to each other and arranged so as to be opposed at an angle of 180 degrees on the rotating drum X. Here, the third and fourth magnetic heads H3 and H4 are arranged away from the first and second magnetic heads H1 and H2 by an angle corresponding to approximately one horizontal line period (referred to as "1H" hereinafter), respectively. The azimuth angles of the first and fourth magnetic heads H1 and H4 are equal to each other, and the azimuth angles of the second and third magnetic heads are equal to each other, respectively.

In the high speed reproduction operation, since the one magnetic head passes through tracks written at different azimuth angles, the amplitude of the reproduced signals changes large and small alternately. For instance, in FIG. 1B, the signal reproduced by the first magnetic head H1 is of waveform as shown by H1a and the signal reproduced by the third magnetic head H3 is of waveform as shown by H3a.

An example of the prior art magnetic reproducing apparatus for reproducing the video signals as described above will be described hereinbelow with reference to FIG. 2. The apparatus is composed of a switch circuit (SW) 1; an FM (frequency modulation) level detecting circuit 2; a low-pass filter (LPF) 3; a high-pass filter (HPF) 4; a chrominance signal reproducing circuit 5; a first time base correcting circuit (TBC1) 6; a luminance signal reproducing circuit 7; a second time base correcting circuit (TBC2) 8; a synchronizing separator circuit (SS) 9; a latch circuit 10; and an adder circuit 11.

The signals H1a and H3a reproduced by the first and third magnetic heads H1 and H3 are amplified through two preamplifiers (not shown) to a predetermined amplitude, respectively and then applied to the switch circuit 1 and the FM level detecting circuit 2. The amplitudes of the two reproduced signals H1a and H3a are detected and compared with each other by the FM level detecting circuit 2 for binarization. The binarized output signal of the FM level detecting circuit 2 is supplied to the latch circuit 10.

The operation of the latch circuit 10 will be described with reference to FIG. 3. First, a horizontal synchronizing signal 9a as shown in FIG. 3(b) is separated synchronously from the reproduced luminance signal 7a as shown in FIG. 3(a) through the synchronizing separator circuit 9. The separated horizontal synchronizing signal 9a is applied to the latch circuit 10 as a clock signal. In response to the rising edge of this clock signal 9a, the latch circuit 10 latches the output signal 2a of the FM level detecting circuit 2 as shown in FIG. 3(c), and outputs a latch circuit output signal 10a as shown in FIG. 3(d) to the switch circuit 1.

In response to the latch circuit output signal 10a, the switch circuit 1 shown in FIG. 2 outputs a switch circuit output signal 1a by switching the two input signals H1a and H3a, respectively. That is, the switch circuit output signal 1a is the signal H1a reproduced through the first magnetic head H1 where the output signal 10a is at a high level, and the signal H3a reproduced through the third magnetic head H3 where the output signal 10a is at a low level, for instance.

As described above, since the horizontal synchronizing signal 9a is used as the clock signal to the latch circuit 10, it is possible to set the switch timing of the reproduced signals within the horizontal blanking period. Therefore, it is possible to generate the noise due to the discontinuity in the FM modulation signal caused when the reproduced signals H1a and H3a are switched, only within the horizontal blanking period (during the period free from the visual problems).

Further, the output signal 1a is applied to the low-pass filter 3 for separating the chrominance signal converted into the low frequency range on the basis of frequency (the low frequency-converted chrominance signal) and to the high-pass filter 4 for separating the modulated luminance signal also on the basis of frequency. The low frequency-converted chrominance signal 3a obtained through the low-pass filter 3 is supplied to the chrominance signal reproducing circuit 5, and the signal 4a obtained through the high-pass filter 4 is supplied to the luminance signal reproducing circuit 7. The chrominance signal reproducing circuit 5 restores the phase rotation of 90 degrees per 1H (one horizontal line period) implemented when the input signal is converted into a low frequency range in the recording operation thereof, on the basis of the synchronizing signal 9a and further converts the restored chrominance signal into the high frequency range in order to obtain the reproduced chrominance signal 5a. The obtained chrominance signal 5a is supplied to the first time base correcting circuit 6. On the other hand, the luminance signal reproducing circuit 7 supplies the reproduced luminance signal 7a obtained by demodulating the input signal in frequency to both the synchronizing separator circuit 9 and the second time base correcting circuit 8.

The first and second time base correcting circuits 6 and 8 correct the time bases of the reproduced chrominance signal 5a and the reproduced luminance signal 7a, respectively on the basis of the horizontal synchronizing signal 9a. The respective chrominance signal 6a and luminance signal 8a thus obtained are outputted to transmission paths (not shown) and the adder circuit 11. Further, the video signal 11a obtained by adding both the signals 6a and 8a is outputted to another transmission path (not shown).

As described above, in the high speed reproduction operation, since the magnetic heads are switched during the horizontal blanking period and further the input signal is demodulated in frequency, the switching noise superposed upon the outputted luminance signal 7a can be generated only the horizontal blanking period so as not to be noticeable on the picture display.

In the prior art video signal reproducing apparatus as described above, however, since the signal reproduced by the first magnetic head H1 is not in phase with the signal reproduced by the third magnetic head H3 at the timing when the magnetic heads are switched, when the horizontal frequency of the reproduced luminance signal 7a changes abruptly, a skew (asymmetrical portion) is inevitably produced. Consequently, even if the phase difference is corrected by the second time base correcting circuit 8, there still exists a problem in that the outputted luminance signal 8a includes a skew in the horizontal line immediately after the magnetic heads have been switched. In the reproduced chrominance signal 5a, on the other hand, since the order of the above-mentioned rotation correction is discontinuous, it takes some time to pull in the phase by an APC (automatic phase control) circuit (not shown), thus causing another problem in that the color is disturbed in the horizontal line immediately after the magnetic heads have been switched.

The problem in the outputted luminance signal 8a will be described in further detail hereinbelow with reference to FIG. 4. FIG. 4(a) shows the reproduced luminance signal 7a-1 related to the first magnetic head H1 obtained when the magnetic heads are not switched; and FIG. 4(b) shows the reproduced luminance signal 7a-2 related to the third magnetic head H3 obtained when the magnetic heads are not switched. In the phase relationship as shown by FIG. 4(a) and FIG. 4(b), the assumption is made that the magnetic heads are switched. In the case where the first magnetic head H1 is switched to the third magnetic head H3 at the switch timing "A", the reproduced luminance signal 7a-3 as shown in FIG. 4(c) can be obtained. Further, in the case where the third magnetic head H3 is switched to the first magnetic head H1 at the switch timing "B", the reproduced luminance signal 7a-4 as shown in FIG. 4(d) can be obtained. The above-mentioned luminance signals 7a-3 and 7a-4 thus obtained have a skew, respectively.

The operation of the second time base correcting circuit 8 for correcting the time base of these signals will be described with reference to FIG. 4(e). The reproduced luminance signal 7a-5 as shown in FIG. 4(e) are written in order in first to seventh line memories M1 to M7 of the second time base correcting circuit 8, for a predetermined time period after the falling edge of the horizontal synchronizing signal 9a, in response to the clock signal (the horizontal synchronizing signal 9a) following the jitter of the reproduced luminance signal 7a-5. Further, the written reproduced luminance signal 7a is read, as the outputted luminance signal 8a as shown in FIG. 4(f), in response to the clock signal of a stable frequency. Here, since the outputted luminance signal 8a related to the fourth line memory M4 includes two horizontal synchronizing signals, a skew is inevitably generated. Further, since the outputted luminance signal 8a related to the sixth line memory M6 is not perfect in waveform shape (at the front half portion), thus generating another skew in the same way.

The problem in the outputted chrominance signal 6a will be described with reference to FIG. 5. FIG. 5(a) shows the output signal 10a of the latch circuit 10; and FIG. 5(b) shows the rotation of the reproduced low frequency-converted chrominance signal 3a obtained when the magnetic heads are switched under the ideal conditions. As shown in FIG. 5, when the output signal 10a of the latch circuit 10 is at a low level, the phase is shifted in such a way as to lag behind in sequence. On the other hand, when the output signal 10a is at a high level, the phase is shifted in such a way as to lead in sequence. As a result, it is possible to maintain the continuity of the phase.

In the prior art apparatus, however, the phase continuity is not necessarily maintained always in practice. The phase discontinuity sometimes occurs for instance in a low frequency-converted chrominance signal 3a-1 at the timings P1 and P2 as shown in FIG. 5(c).

The problem caused by the phase discontinuity as described above will be described with reference to FIG. 6, in which a prior art color rotation processor BB is shown. This processor is composed of a 4-phase signal generating circuit 63, a switching circuit 64, a frequency converting circuit 65, a 2-bit counter circuit 66, a first phase comparing circuit (P/D1) 90, a second phase comparing circuit (P/D2) 91, and a quartz oscillating circuit 92.

The frequency converting circuit 65 multiplies the output signal 64a of the switching circuit 64 by the reproduced low frequency-converted signal 3a (obtained through the low-pass filter 3 shown in FIG. 2) for conversion into a high frequency range, and outputs a high frequency-converted signal bb (3.58 MHz). The outputted signal bb is supplied to the second phase comparing circuit 91 for comparison in phase with the signal from the quartz oscillating circuit 92 (a stable oscillation source). The second phase comparing circuit 91 feedbacks the compared results to a voltage controlled oscillating circuit (not shown) for generating a local signal (4.2 MHz) included in the 4-phase signal generating circuit 63. In summary, the circuit shown in FIG. 6 forms an APC (Automatic Phase Control) loop for obtaining a stable high frequency-converted signal bb.

In addition, the high frequency-converted signal bb is also applied to the first phase comparing circuit 90 for comparison in phase with the signal supplied from the quartz oscillating circuit 92. In case where there exists a discontinuity in phase of the above-mentioned color rotation, the first phase comparing circuit 90 supplies a control signal to the 2-bit counter circuit 66 to restore the phase compulsorily. In other words, the 2-bit counter circuit 66 applies signals 66a, based on the horizontal synchronizing signal 9a, the latch circuit output signal 10a and the control signal, to the switching circuit 64, so that the switching circuit 64 can selects any one of the first to fourth local oscillation signals S0 to S3. As described above, in the prior art apparatus, the discontinuity in phase of color rotation has been corrected in accordance with the feedback loop thus constituted as described above.

In the prior art configuration, however, since the phase discontinuity can be detected only after the high frequency-converted signal bb has been outputted, the high frequency-converted signal bb is not perfectly continuous and therefore the phase discontinuity still remains, thus raising a problem in that color is disturbed in the horizontal line immediately after the magnetic heads have been switched.

SUMMARY OF THE INVENTION

The object of the present invention is to provide apparatus for reproducing video signals recorded in a magnetic recording medium by magnetic heads in which skew or discontinuity of the reproduced signals are compensated.

The apparatus according to the present invention serves for reproducing video signal from a magnetic recording medium using first and second magnetic heads having mutually different azimuth angles, the video signal being obtained by frequency-multiplexing of a low frequency-converted chrominance signal which is obtained by conversion into a low frequency range and phase rotation of chrominance signal per horizontal scanning period, and a modulated luminance signal, and recorded in the magnetic recording medium. The apparatus comprises switching means for selecting one of video signals picked up by the first and second magnetic heads to obtain a chain of reproduced video signal, phase detection means for detecting discontinuity in the phase rotation of the low frequency-converted chrominance signal in the reproduced video signal and color reproduction processing means for reconverting the low frequency-converted chrominance signal in the reproduced video signal into a high frequency range chrominance signal having no phase rotation, wherein the color reproduction processing means forcibly corrects the phase rotation of the low frequency-converted chrominace signal in the reproduced video signal when the discontinuity in the phase rotation is detected.

There is also provided an apparatus for reproducing video signal from a magnetic recording medium using first and second magnetic heads having mutually different azimuth angles, comprising:

This apparatus comprises switching means for selecting one of video signals picked up by the first and second magnetic heads to obtain a chain of reproduced video signal, means for demodulating the reproduced video signal to obtain a luminance signal, time base corrector means for writing the luminance signal in a memory in response to a clock signal following to a jitter component included in the luminance signal and reading the written luminance signal out of the memory in response to another clock signal having a fixed frequency, means for delaying a horizontal synchronizing signal included in the luminance signal by a specific time period which is shorter than one horizontal scanning period, thereby producing a first control signal and means for producing a second control signal by comparing amplitudes of the video signals picked up by first and second magnetic heads with each other, said switching means conducting the switching operation in response to the first and second control signals.

BRIEF DESCRIPTION OF THE DRAWINGS

FIG. 4 is a timing chart for assistance in explaining the problem related to the reproduced luminance signal 7a;

FIG. 5 is a conceptual diagram for assistance in explaining the problem related to the reproduced chrominance signal 5a;

DETAILED DESCRIPTION OF THE PREFERRED EMBODIMENTS

Embodiments of the present invention will be described hereinbelow with reference to the attached drawings.

First embodiment

Figure 1A:
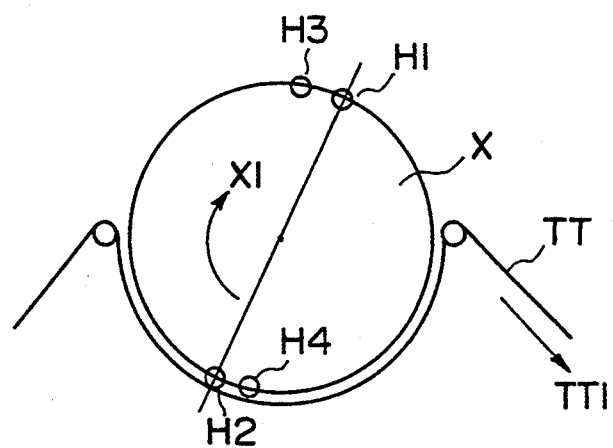
FIGS. 1A and 1B are conceptual illustrations for assistance in explaining the tape pattern obtained at the high speed reproduction operation.
Figure 1B:
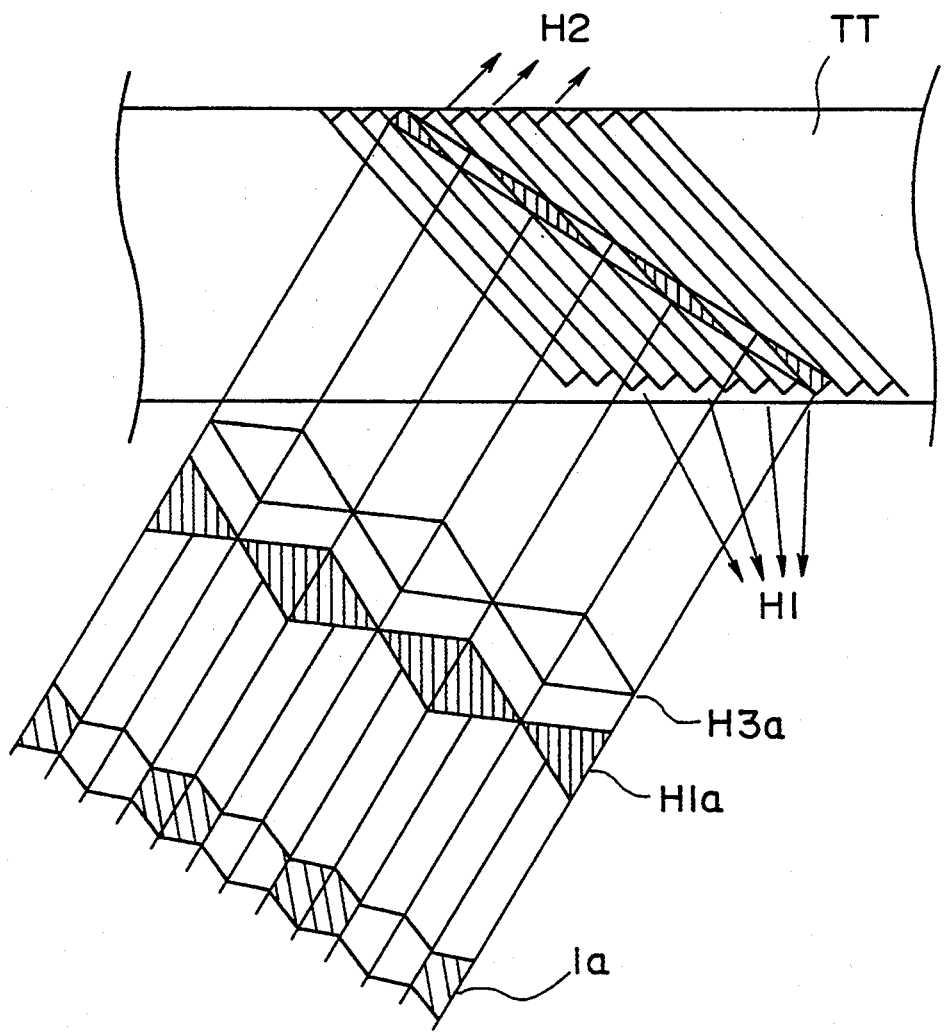
Figure 2:
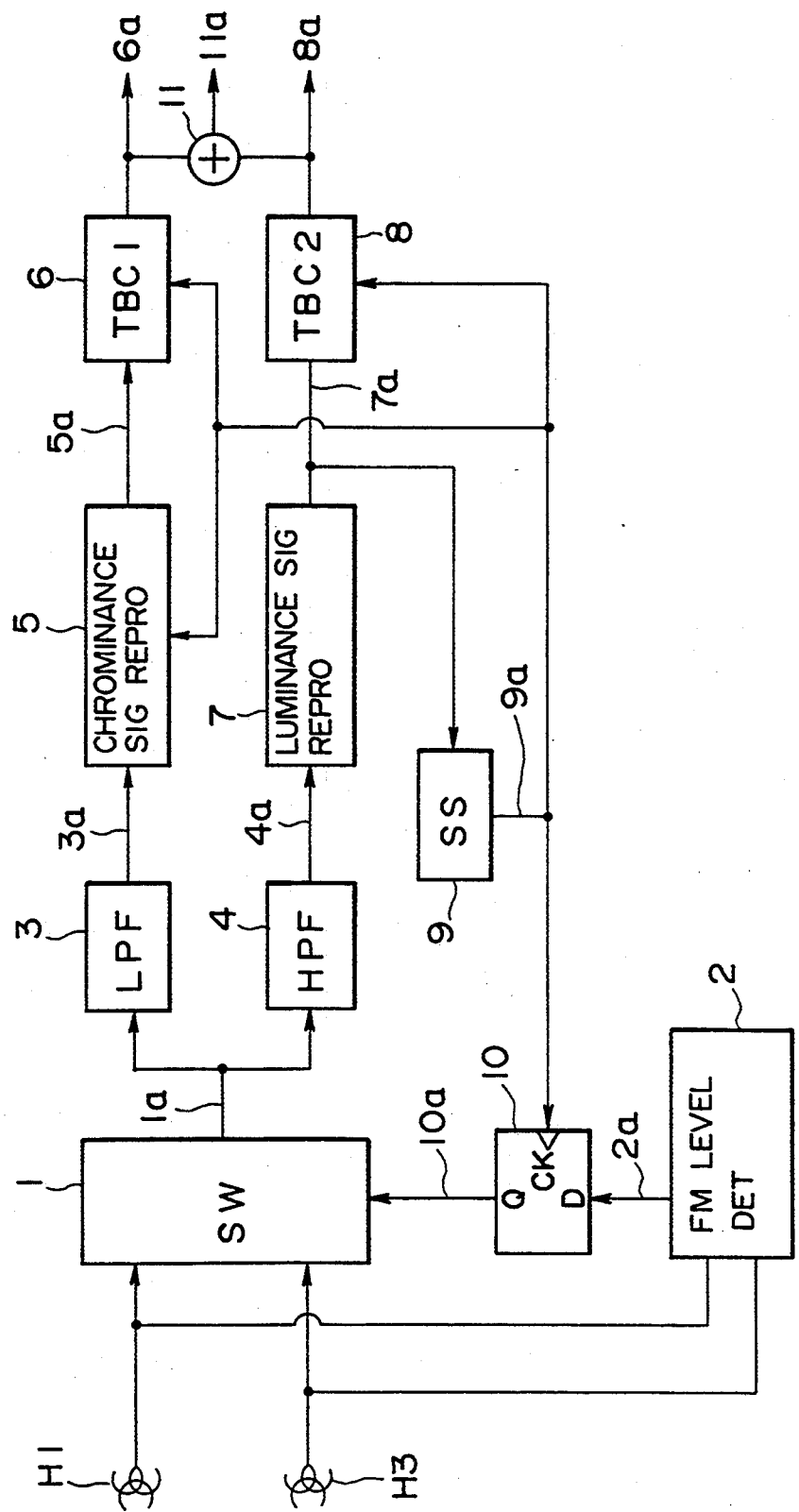
FIG. 2 is a block diagram showing a prior art magnetic video signal reproducing apparatus.
Figure 3:
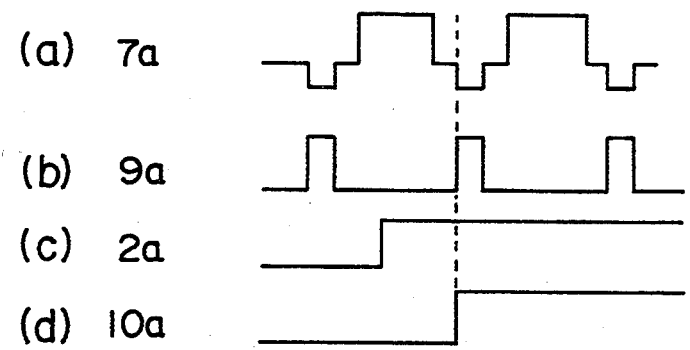
FIG. 3 is a timing chart for assistance in explaining the magnetic head switching operation within the horizontal blanking periods.
Figure 4:
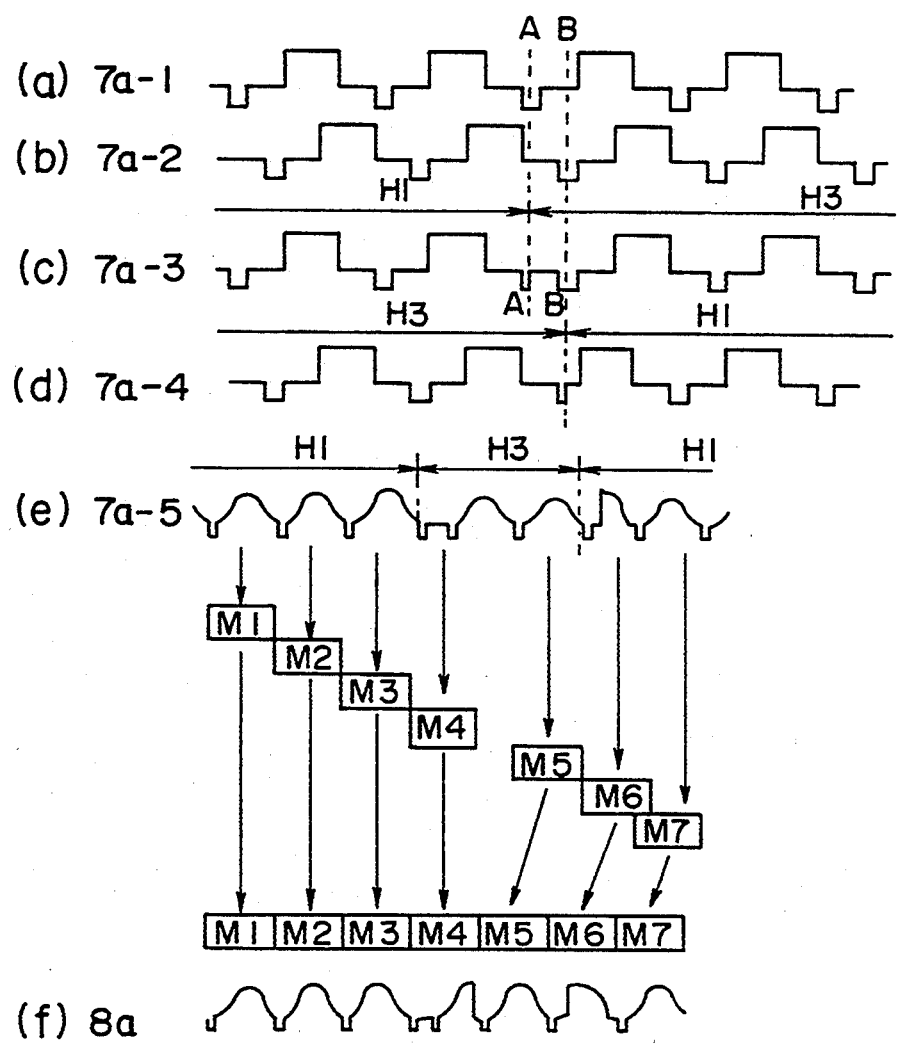
Figure 5:
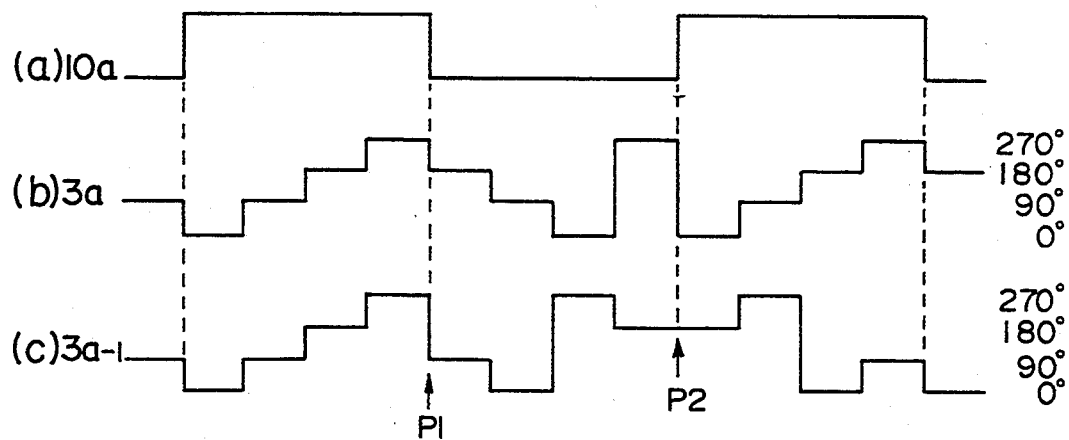
Figure 7:
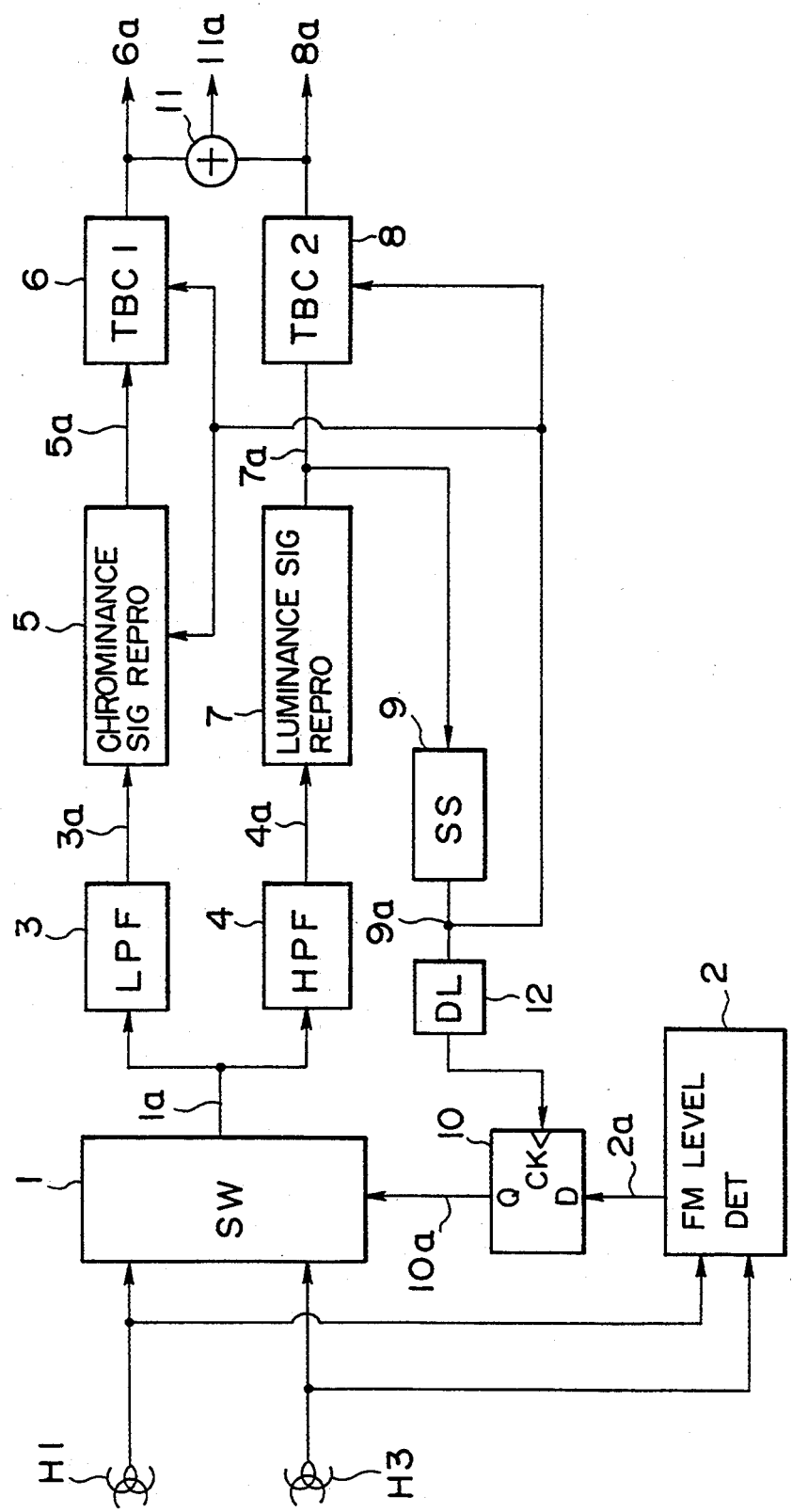
FIG. 7 is a block diagram showing the first embodiment of the magnetic reproducing apparatus according to the present invention.

A magnetic video signal reproducing apparatus of the present invention will be described with reference to FIG. 7, in which the same reference numerals as in FIG. 2 have been retained for similar elements or sections which have the same functions, without repeating any detailed description thereof. The point different between the apparatus shown in FIGS. 2 and 7 is that a delay circuit 12 is additionally incorporated to FIG. 7. In the prior art apparatus, the horizontal synchronizing signal 9a is directly supplied to the latch circuit 10 as a clock signal. In the apparatus of the present embodiment, the horizontal synchronizing signal 9a is delayed through the delay circuit 12 by a predetermined delay time T, before being inputted to the latch circuit 10 as the clock signal.

A counter well known to the art which counts clock signals generated by a crystal oscillator can be employed as the delay circuit 12. This counter is reset at the rising edge of the horizontal synchronizing signal 9a and outputs a pulse signal when counting a specific number of clock signals corresponding to the delay time T.

Figure 8:
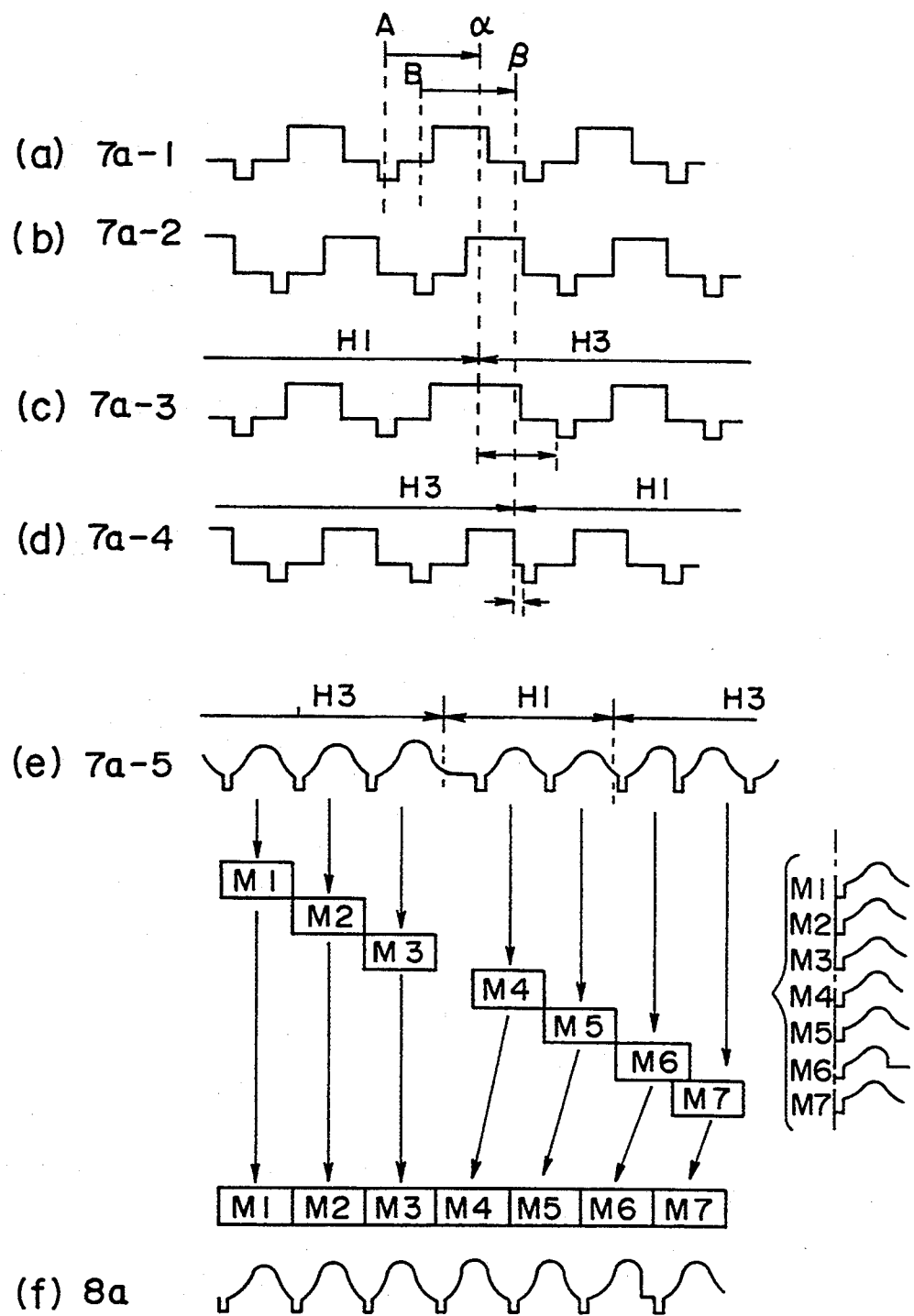
FIG. 8 is a timing chart for assistance in explaining the operation of the second time base correcting circuit 8 of the first embodiment of the present invention.

On the basis of the delayed clock signal, it is possible to improve a skew of the reproduced luminance signal 7a by the second time base correcting circuit 8, as explained hereinbelow in more detail with reference to FIG. 8:

In the same way as in FIG. 4(a) and FIG. 4(b), FIG. 8(a) and FIG. 8(b) show the reproduced luminance signals 7a-1 and 7a-2 of the first and third magnetic heads, respectively obtained when the magnetic heads are not switched. As shown, owing to the presence of the delay circuit 12, the actual switch timings "A" and "B" of the magnetic heads are delayed by the delay time T; that is, the magnetic heads are switched apparently at the timings "α" and "β", respectively. Accordingly, when the first magnetic head H1 is switched to the third magnetic head H3, it is possible to obtain the reproduced luminance signal 7a-3 as shown in FIG. 8(c). On the other hand, when the third magnetic head H3 is switched to the first magnetic head H1, it is possible to obtain the reproduced luminance signal 7a-4 as shown in FIG. 8(d).

The operation of the second time base correcting circuit 8 for correcting the time bases of these signals will be described hereinbelow with reference to the waveform shown in FIG. 8(e). The reproduced luminance signal 7a-5 as shown in FIG. 8(e) are written in order in the first to seventh line memories M1 to M7 of the second time base correcting circuit 8, for a predetermined time period after the falling edge of the horizontal synchronizing signal 9a, in response to the clock signal generated on the basis of the horizontal synchronizing signal 9a following the jitter of the reproduced luminance signal 7a-5. Further, the written reproduced luminance signal 7a-5 is read, as the outputted luminance signal 8a as shown in FIG. 8(f), in response to the clock signal of a stable frequency.

As described above, since the magnetic heads are switched by delaying the output signal 10a of the latch circuit 10 through the delay circuit 12 by the delay time T, it is possible to obtain the outputted luminance signal 8a whose skew has been improved. Here, it is preferable that the delay time T is the maximum value less than $(1H - \tau)$, where $\tau$ denotes the skew generated between both the magnetic heads.

Figure 9:
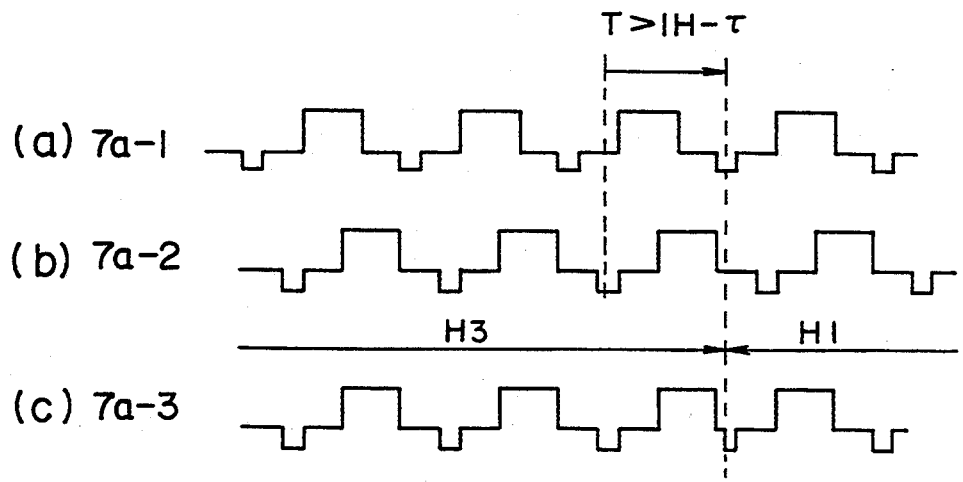
FIG. 9 is a timing chart for assistance in explaining the delay time T of a delay circuit 12.
Figure 10:
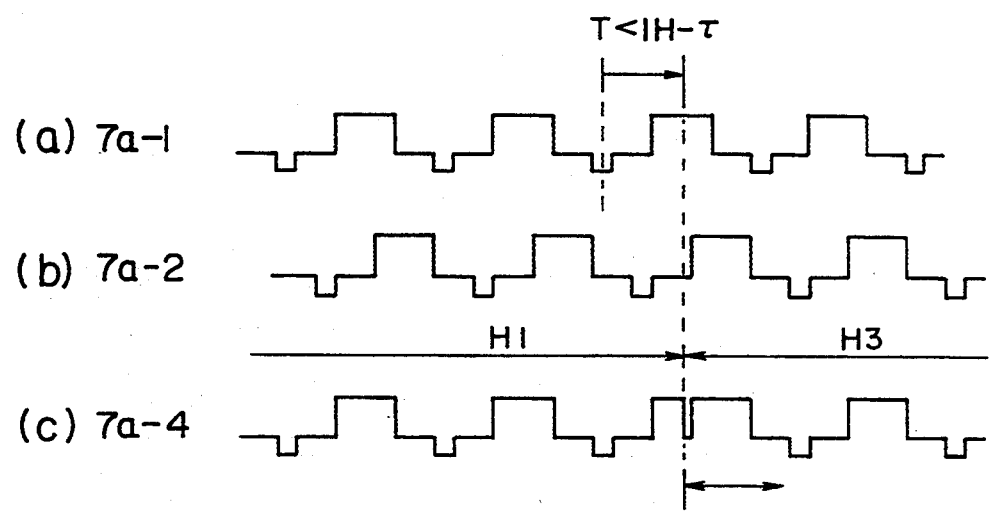
FIG. 10 is a timing chart for assistance in explaining the delay time T of the delay circuit 12.

The reason of the above-mentioned relationship will be described with reference to FIGS. 9 and 10. In the case where the delay time T exceeds the time $(1H - \tau)$ as shown in FIG. 9 and further the after-switch signal (the signal selected after switching) as shown in FIG. 9(a) leads the before-switch signal (the signal selected before switching) as shown in FIG. 9(b), there exists such a disadvantage that the horizontal synchronizing signal portion (9a) on the reproduced luminance signal 7a is narrower in waveform width (in the front portion). On the other hand, in the case where the delay time T is excessively short as compared with the $(1H - \tau)$ as shown in FIG. 10 and further the signal is switched from the state as shown in FIG. 10(a) to that as shown in FIG. 10(b), there exists such a disadvantage that the switching noise of the magnetic heads appears at a middle portion of the picture, as shown in FIG. 10(c). Accordingly, it is preferable to set the delay time T at the maximum value not more than the time $(1H - \tau)$.

In the first embodiment, the skew has been improved by appropriately setting the delay circuit 12 and the delay time T. However, there are some cases where the switching noise of the magnetic heads appears at a middle of the picture display (referred to as "in-picture switching noise" hereinafter) according to the skew time generated between both the magnetic heads.

Second embodiment

In the second embodiment, the in-picture switching noise can be eliminated by improving the write and read control operation to and from the line memories which constitute the second time base correcting circuit 8.

The second time base correcting circuit 8 will be described hereinbelow with reference to FIG. 11. The circuit comprises an A/D converting circuit 81, a D/A converting circuit 87, first to fourth line memories 82 to 85 (referred to as A to D memories, hereinafter) each for storing information data for one horizontal line (1H), and a memory control circuit 86.

Figure 11:
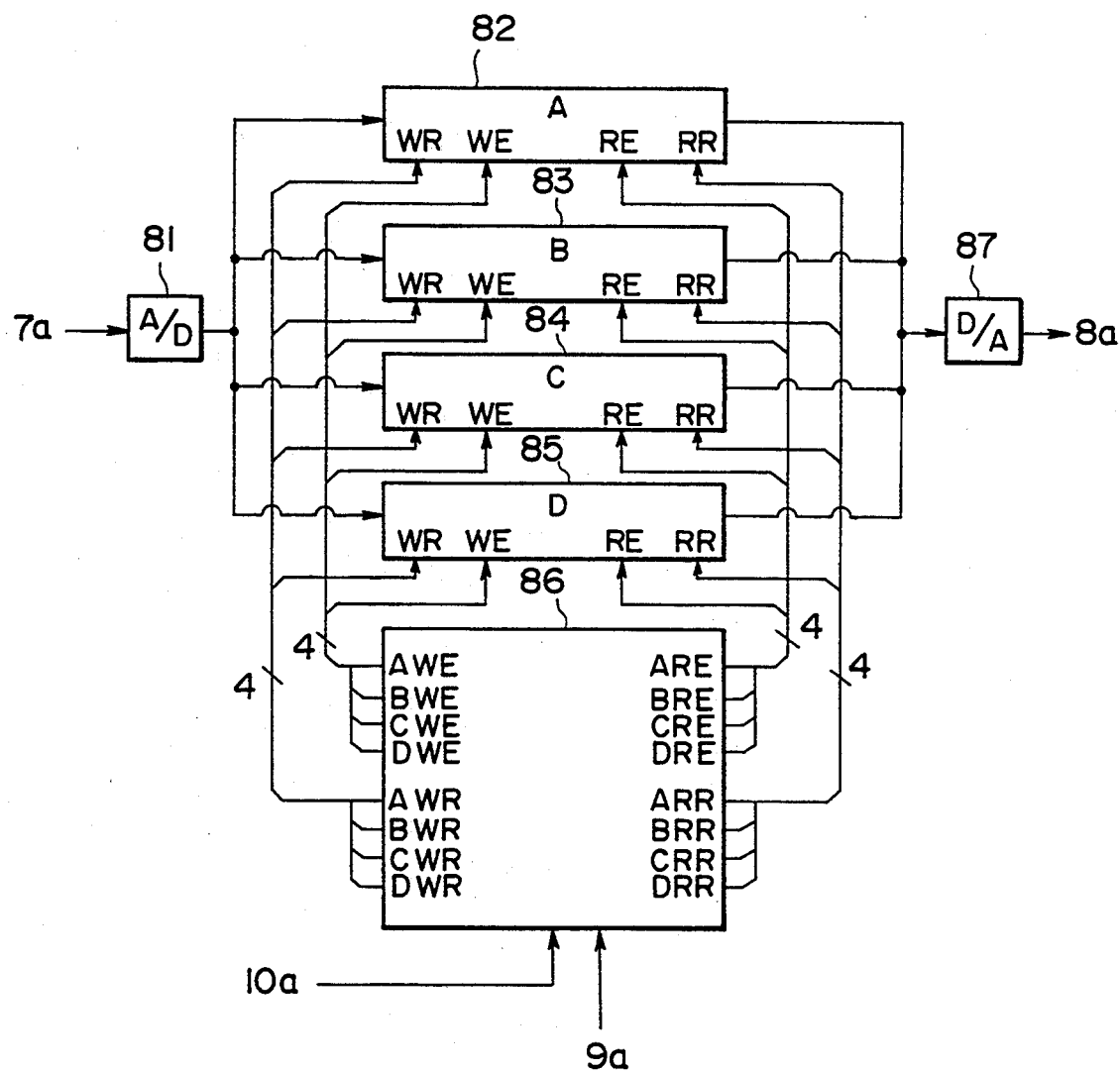
FIG. 11 is a block diagram showing the second time base correcting circuit 8 of the second embodiment of the present invention.

Further, in FIG. 11, the output terminals AWE to DWE, AWR to DWR, ARE to DRE, and ARR to DRR of the memory control circuit 86 denote the kinds of control signals outputted therefrom. In more detail, the AWE to DWE are write enable signals for setting the A to D memories to the write enable status at the high level thereof; the AWR to DWR are write reset signals for resetting the write addresses of the A to D memories at the high level thereof; ARE to DRE are read enable signals for setting the A to D memories to the read enable status at the high level thereof; and ARR to DRR are read reset signals for resetting the read addresses of the A to D memories at the high level thereof. That is, the A to D memories are all controlled in response to these control signals.

All these memories A to D are not necessarily required to eliminating noise. Therefore, only the following four methods are explained.

Figure 12:
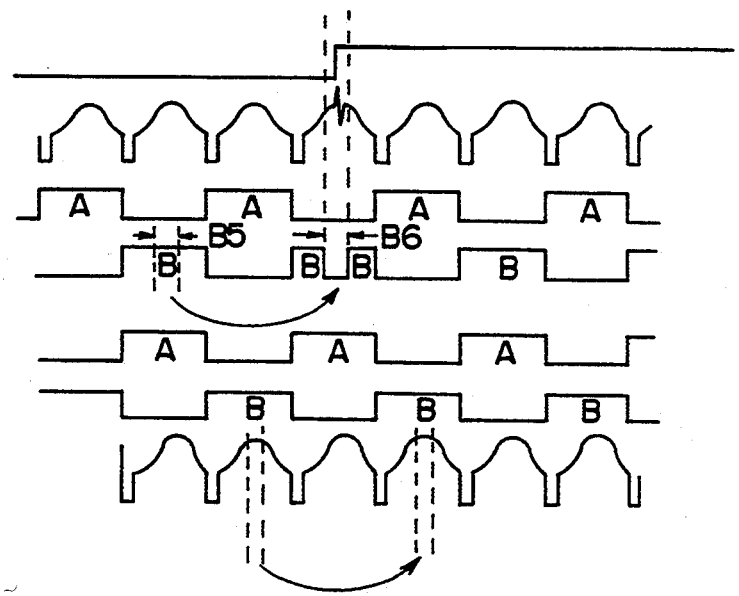
FIG. 12 is a timing chart for assistance in explaining the first method of eliminating noise.

The first method is to eliminate noise by stopping the reproduced luminance signal 7a from being written in the A and B memories (i.e. two 1H memories) as long as the in-picture switching noise is present, for improvement of noise elimination. This method will be explained in further detail with reference to FIG. 12.

The magnetic heads are switched in response to the output signal 10a of the latch circuit 10 as shown in FIG. 12(a). Therefore, the continuity of the FM (frequency modulated) signal is lost at the rising edge of the latch output signal 10a, with the result that the reproduced (demodulated) luminance signal 7a includes noise in synchronism with the rising edge of the latch output signal 10a, as shown in FIG. 12(b). The reproduced luminance signal 7a is usually controlled in such a way as to be written alternately for each 1H (one horizontal period) in the A and B memories of the second time base correcting circuit 8. Further, when the reproduced luminance signal 7a is being written in one memory, the other reproduced luminance signal 7a already written in the other memory before 1H is read.

However, near the rising edge of the latch output signal 10a, the signal writing operation to the memory is stopped and further the reproduced luminance signal 7a is written to the B memory on the basis of the write enable signal BWE (whose level is low during the period B6), as shown in FIG. 12(d). On the other hand, the signal writing operation to the A memory is performed in the same way as usual on the basis of the write enable signal AWE as shown in FIG. 12(c).

When the reproduced luminance signal 7a is written in response to the write enable signal BWE as described above, since no luminance signal 7a is written during the period B6, the reproduced luminance signal 7a written during the period B5 is kept stored in the B memory.

The stored signal is read on the basis of the read enable signals ARE and BRE as shown in FIG. 12(e) and FIG. 12(f). That is, the luminance signal 8a as shown in FIG. 12(g) can be obtained by interpolating the noise period on the basis of the reproduced luminance signal 7a obtained 2H before. In this case, further, it is of course possible to stop all the writing operation for the horizontal line including noise.

Figure 13:
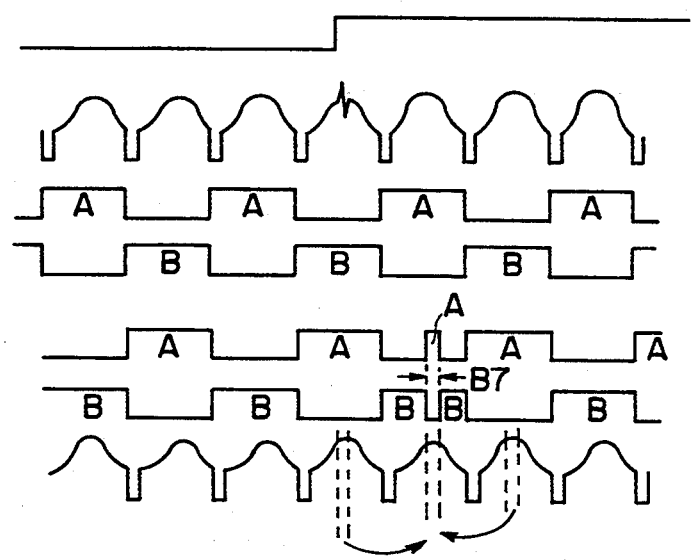
FIG. 13 is a timing chart for assistance in explaining the second method of eliminating noise.

The second method is to eliminate noise by reading the luminance signal written in the A and B memories (i.e. two 1H memories) written during the period at which in-picture switching noise is absent, without reading the reproduced luminance signal written in the A and B memories during the period at which in-picture switching noise is present, for improvement of noise elimination. This method will be explained in further detail with reference to FIG. 13.

The magnetic heads are switched in response to the output signal 10a of the latch circuit 10 as shown in FIG. 13(a). Therefore, the continuity of the FM (frequency modulated) signal is lost at the rising edge of the latch output signal 10a, with the result that the reproduced (demodulated) luminance signal 7a includes noise in synchronism with the rising edge of the latch output signal 10a, as shown in FIG. 13(b). The reproduced luminance signal 7a is usually controlled in such a way as to be written alternately for each 1H (one horizontal period) in the A and B memories of the second time base correcting circuit 8 on the basis of the write enable signals AWE and BWE as shown in FIG. 13(c) and FIG. 13(d). Further, when the reproduced luminance signal 7a is being written in one memory, the other reproduced luminance signal 7a already written in the other memory before 1H is read on the basis of the read enable signals ARE and BRE as shown in FIG. 13(e) and FIG. 13(f).

However, during the period B7 when the signal including noise and written in the B memory is read as shown in FIG. 13(e), the read enable signal BRE is set to a low level to stop reading the signal from the B memory. Further, the read enable signal ARE is set to a high level to read the signal from the A memory. As described above, the luminance signal 8a as shown in FIG. 13(g) is obtained by interpolating the period at which noise is present by use of the other period at which noise is absent.

The third method is to stop writing the reproduced luminance signal 7a in the memories, as long as the in-picture switching noise is present, by use of three or more memories for improvement of noise elimination. In the first method, when the number of memories to be used increases, the waveform of the interpolated signal deviates from the standpoint of time, and therefore the interrelation between the reproduced luminance signal and the interpolated signal deteriorates. Being similar to the first method, this third method can overcome the above-mentioned problem.

Figure 14:
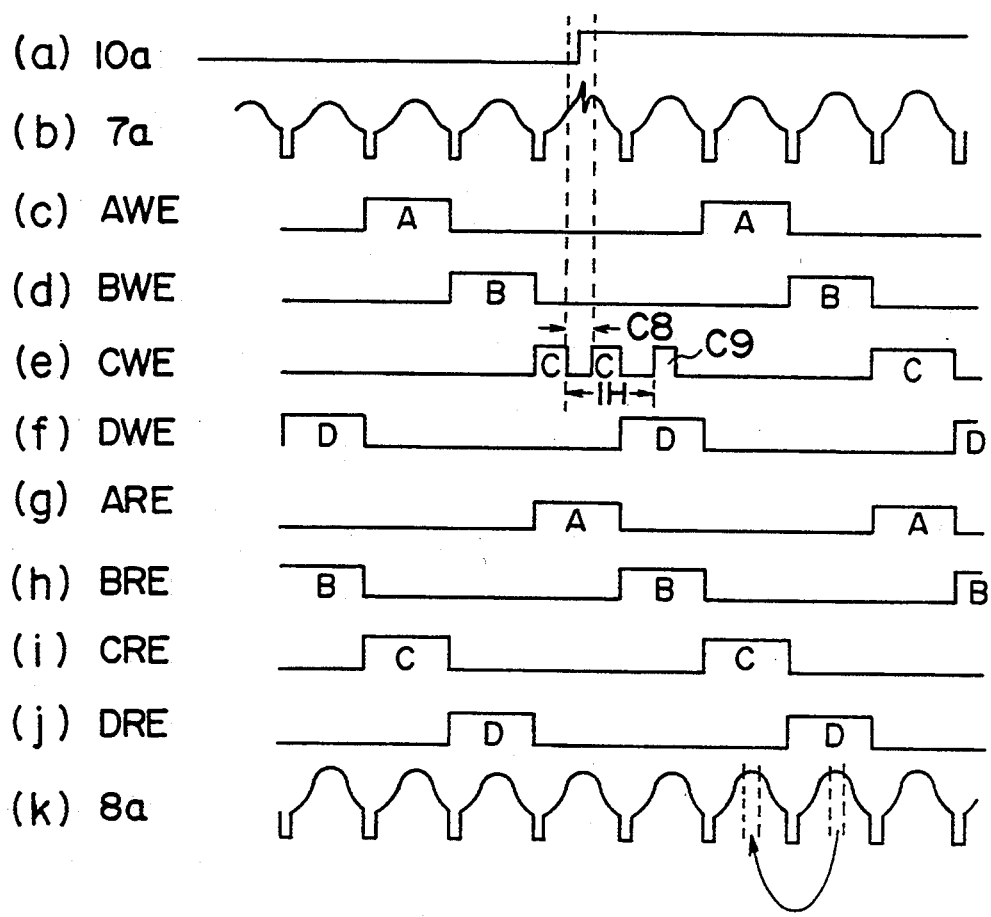
FIG. 14 is a timing chart for assistance in explaining the third method of eliminating noise.

The third method will be described with reference to FIG. 14, in which four memories are used for convenience. However, the following is applicable to the case where three or five or more memories are used.

The magnetic heads are switched in response to the output signal 10a of the latch circuit 10 as shown in FIG. 14(a). Therefore, the continuity of the FM (frequency modulated) signal is lost at the rising edge of the latch output signal 10a, with the result that the reproduced (demodulated) luminance signal 7a includes noise in synchronism with the rising edge of the latch output signal 10a, as shown in FIG. 14(b). The reproduced luminance signal 7a is usually controlled in such a way as to be written cyclically for each 1H (one horizontal period) in the A and B memories of the second time base correcting circuit 8. Further, when the reproduced luminance signal 7a is being written in one memory, the other reproduced luminance signal 7a already written in the other memory before 1H is read.

However, near the rising edge of the latch output signal 10a, the signal writing operation to the memory is stopped and further the reproduced luminance signal 7a is written to the C memory on the basis of the write enable signal CWE (whose level is low during the period C8, but high during the period C9 1H after C8 for the same period as C8), as shown in FIG. 14(e). On the other hand, the signal writing operation to the A, B and D memories is performed in the same way as usual on the basis of the write enable signals AWE, BWE and DWE as shown in FIG. 14(c), FIG. 14(d) and FIG. 14(f).

As described above, when the write enable signal CWE is used, although the signal is not written during the period C8, since the signal is written during the period C9 having interrelation with the period C8, it is possible to write the reproduced luminance signal 7a interpolated in place of noise in the C memory.

The stored signal is read on the basis of the read enable signals ARE to DRE as shown in FIG. 14(g) to FIG. 14(j). That is, the luminance signal 8a as shown in FIG. 14(k) can be obtained by interpolating the noise period on the basis of the reproduced luminance signal 7a obtained 1H after.

The fourth method is to eliminate noise by reading the luminance signal written in the three or more memories during the period at which in-picture switching noise is absent, without reading the reproduced luminance signal written in the same memories during the period at which in-picture switching noise is present, for improvement of noise elimination. In the second method, when the number of memories to be used increases, the waveform of the interpolated signal deviates from the standpoint of time, and therefore the interrelation between the reproduced luminance signal and the interpolated signal deteriorates. Being similar to the second method, this fourth method can overcome the above-mentioned problem.

Figure 15:
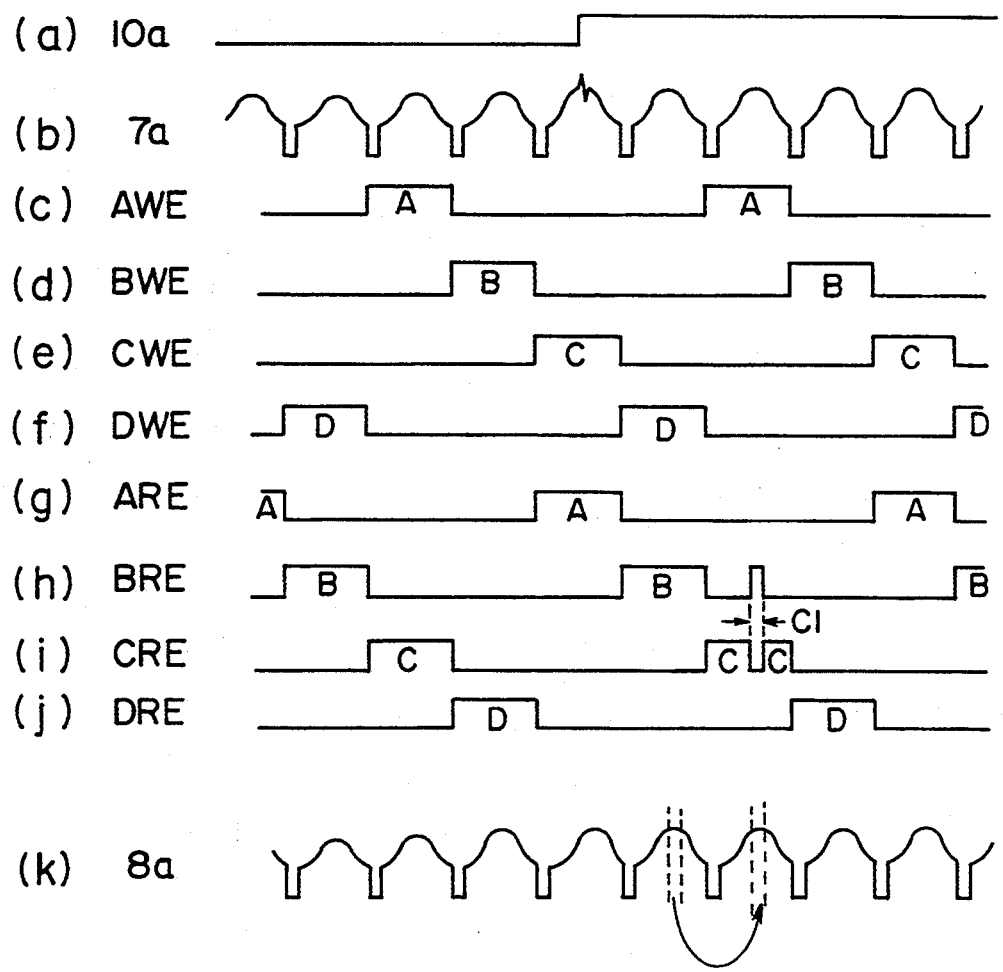
FIG. 15 is a timing chart for assistance in explaining the fourth method of eliminating noise.

This method will be explained in further detail with reference to FIG. 15, in which four memories are used for convenience. However, the following is applicable to the case where three or five or more memories are used.

The magnetic heads are switched in response to the output signal 10a of the latch circuit 10 as shown in FIG. 15(a). Therefore, the continuity of the FM (frequency modulated) signal is lost at the rising edge of the latch output signal 10a, with the result that the reproduced (demodulated) luminance signal 7a includes noise in synchronism with the rising edge of the latch output signal 10a, as shown in FIG. 15(b). The reproduced luminance signal 7a is usually controlled in such a way as to be written cyclically for each 1H (one horizontal period) in the A to D memories of the second time base correcting circuit 8 on the basis of the write enable signals AWE to DWE as shown in FIG. 15(c) to FIG. 15(f), respectively. Further, when the reproduced luminance signal 7a is being written in one memory, another reproduced luminance signal 7a already written in another memory 2H before is read in sequence on the basis of the read enable signals ARE and DRE as shown in FIG. 15(g) and FIG. 15(j), respectively.

However, during the period when the signal including noise and written in the C memory is read as shown in FIG. 15(b), the read enable signal CRE is set to a low level during the period C1 as shown in FIG. 15(i) to stop reading the signal from the C memory. Instead, the read enable signal BRE is set to a high level during the period C1 to read the signal from the B memory. As described above, the luminance signal 8a as shown in FIG. 15(k) can be obtained by interpolating the period at which noise is present by use of the other period at which noise is absent.

Third embodiment

In the above-mentioned first and second embodiments, the improvement is related to the luminance signal. In this third embodiment, the improvement is related to the chrominance signal for correcting the color rotation caused when the magnetic heads are switched. This third embodiment will be described hereinbelow with reference to FIGS. 16 to 27.

Figure 16:
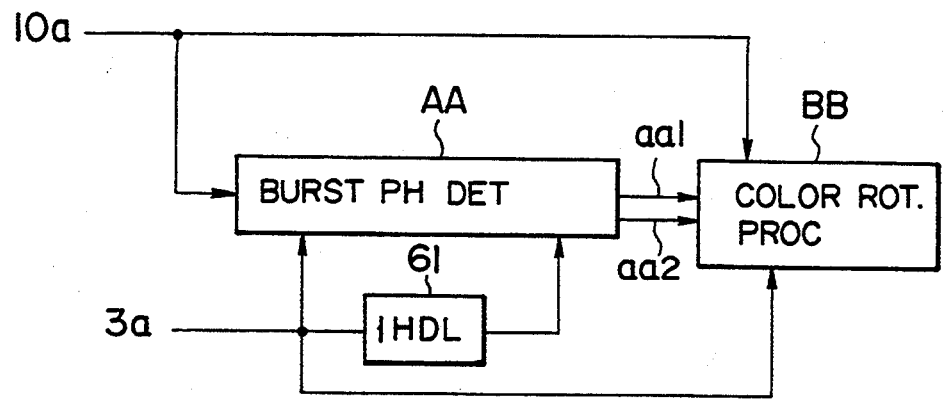
FIG. 16 is a block diagram showing the main portion of the chrominance signal reproducing circuit 5 of the third embodiment of the present invention.

FIG. 16 shows the main portion of the chrominance signal reproducing circuit 5 of this embodiment, which comprises a burst phase detecting circuit AA, a color rotation processor BB, and a 1-H delay circuit (1HDL) 61. The burst phase detecting circuit AA detects the discontinuity of color rotation caused when the magnetic heads are switched; that is, detects the phase difference of the burst signal included in the reproduced low frequency-converted chrominance signal 3a before or after the timing at which the magnetic heads are switched in response to the output signal 10a of the latch circuit 10 shown in FIG. 7. In other words, the reproduced low frequency-converted chrominance signal 3a is supplied to the burst phase detecting circuit AA before and after being passed through the 1-H delay circuit 61. The phase difference between the two (before and after) chrominance signals 3a is detected by the detecting circuit AA, and then two first and second color rotation correcting signals aa1 and aa2 (the command signals for leading the phase by 90 and 180 degrees, respectively) are supplied to the color rotation processor BB, for color rotation correction.

Figure 17:
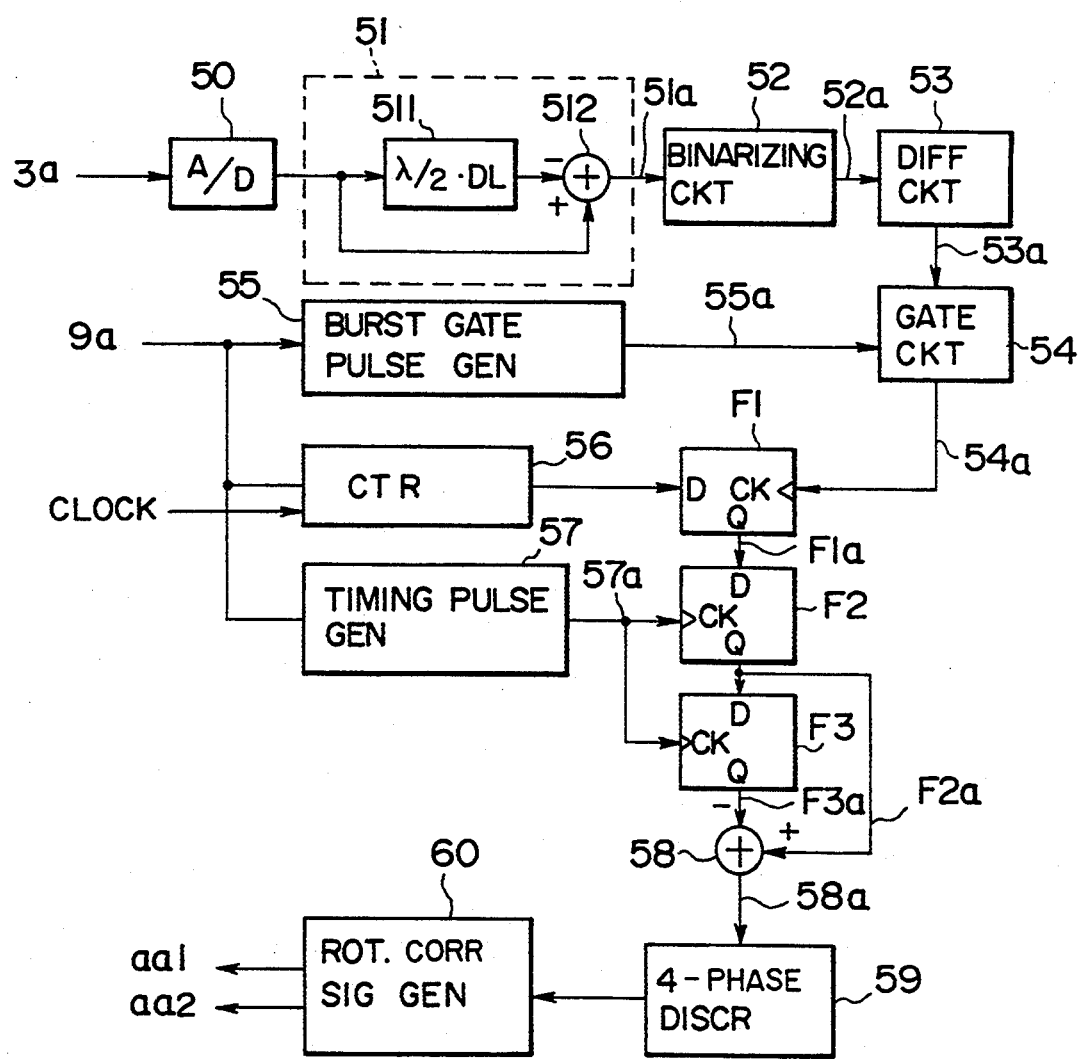
FIG. 17 is a block diagram showing a burst phase detecting circuit AA.
Figure 18:
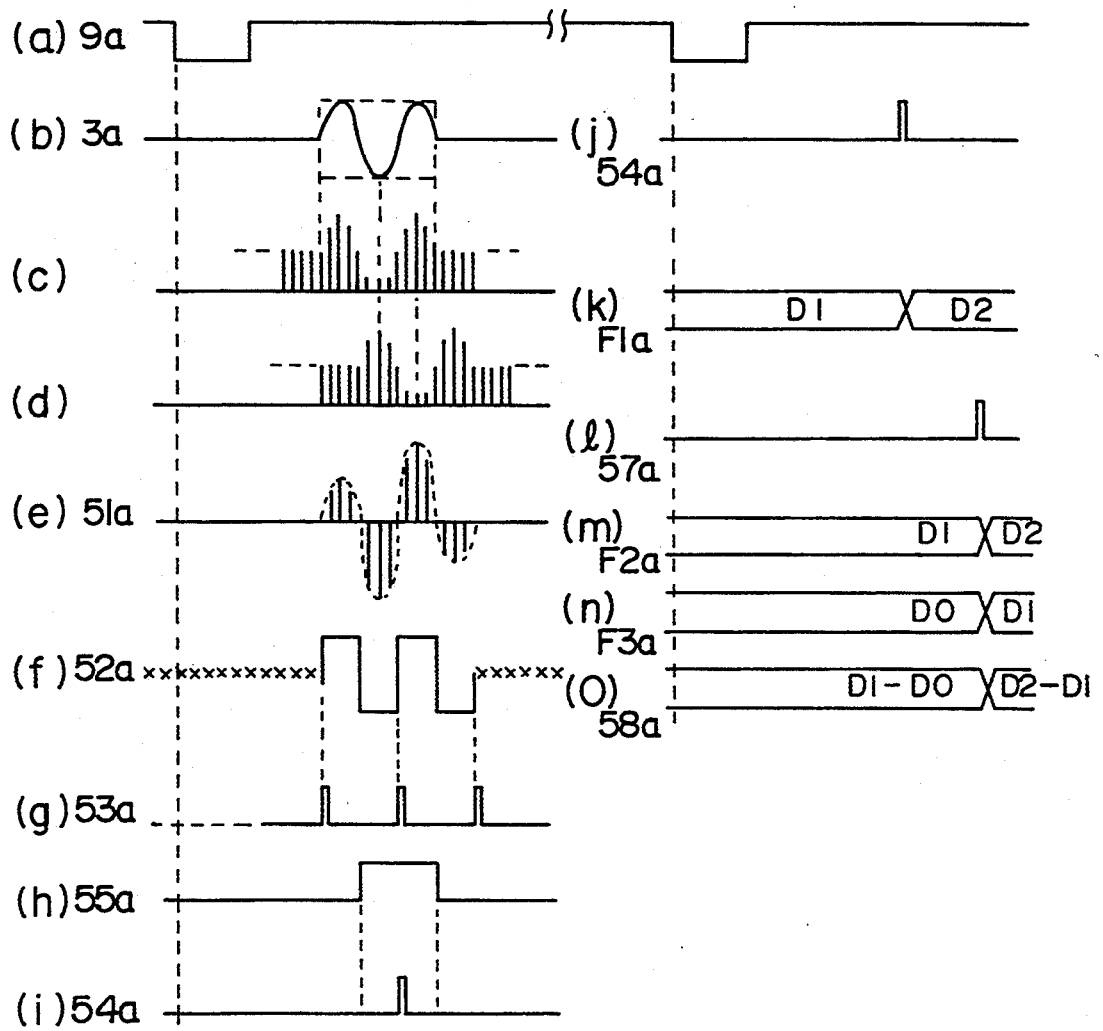
FIG. 18 is a timing chart for assistance in explaining the operation of the burst phase detecting circuit AA.

The burst phase detecting circuit AA will be described in further detail hereinbelow with reference to FIGS. 17 and 18. In FIG. 17, the burst phase detecting circuit AA comprises an A/D converting circuit 50, a filter circuit 51, a binarizing circuit 52, a differentiating circuit 53, a gate circuit 54, a burst gate pulse generating circuit 55, a counter circuit 56, a timing pulse generating circuit 57, a subtracting circuit 58, a 4-phase discriminating circuit 59, a rotation correction signal generating circuit 60, and latch circuits F1 to F3.

The reproduced low frequency-converted chrominance signal 3a having the carrier frequency of 629 kHz as shown in FIG. 18(b) is applied to the A/D converting circuit 50 which then outputs the signal as shown in FIG. 18(c).

The signal shown in FIG. 18(c) is applied to the filter circuit 51 which is composed of a first delay circuit 511 ($\lambda/2$ DL) for providing a delay time of a half wavelength of the carrier frequency and a first subtracter 512. FIG. 18(d) shows an output signal of the first delay circuit 511, which is delayed by $\lambda/2$ from the input signal shown in FIG. 18(c). Therefore, the subtracter 512 outputs a subtraction signal 51a as shown in FIG. 18(e) to the binarizing circuit 52. The binarizing circuit 52 extracts the sign bit of the output signal 51a of the subtracter 512, and supplies the binarized signal 52a as shown in FIG. 18(f) to the differentiating circuit 53. This differentiating circuit 53 generates a differentiated signal 53a as shown in FIG. 18(g) in synchronism with the rising edge of the binarized signal 52a.

A gate pulse 55a as shown in FIG. 18(h) is supplied from the burst gate pulse generating circuit 55 to the gate circuit 54 on the basis of the horizontal synchronizing signal 9a shown in FIG. 18(a).

The differentiated signal 53a is gated by the gate circuit 54 on the basis of the gate pulse 55a and outputted to the latch circuit F1 as a phase information signal 54a as shown in FIG. 18(i).

Accordingly, the time interval between the falling edge of the horizontal synchronizing signal 9a and the rising edge of the phase information signal 54a indicates the phase information of the burst signal related to the reproduced low frequency-converted signal 3a. Therefore, it is possible to obtain the phase of the burst signal by measuring the above-mentioned time interval for each horizontal line. In addition, it is possible to discriminate the continuity of the color rotation by comparing the measured interval with the next measured interval, as described in further detail below.

For convenience, the phase information signal 54a as shown in FIG. 18(j) is supplied to the first latch circuit F1 as a clock signal. Further, a count data of the counter circuit 56, which is cleared to start counting a clock signal supplied by a clock signal generator (not shown) in response to the falling edge of the horizontal synchronizing signal 9a, is supplied to the first latch circuit F1. The first latch circuit F1 latches the counted data of the counter circuit 56 in response to the phase information signal 54a, and outputs the first latched data F1a as shown in FIG. 18(k) to the second latch circuit F2.

On the other hand, the timing pulse generating circuit 57 supplies a timing pulse 57a as shown in FIG. 18(l) to the second latch circuit F2. This timing pulse 57a is generated in response to the horizontal synchronizing signal 9a and delayed from the rising edge of the phase information signal 54a by a constant time. The second latch circuit F2 latches the output data F1a of the first latch circuit F1 in response to this timing pulse 57a, and outputs the second latched data F2a as shown in FIG. 18(m) to the third latch circuit F3. In the same way, the third latch circuit F3 latches the output of the second latch circuit F2 in response to the timing pulse 57a, and outputs the third latched data F3a as shown in FIG. 18(n) to the succeeding stage. D0 to D2 shown in FIG. 18(m) and FIG. 18(n) denote the data representative of the phases of the burst signals in the zeroth horizontal line to the second horizontal line, respectively.

Further, the second subtracter 58 subtracts the third output data F3a from the second output data F2a, and supplies the obtained phase difference data 58a as shown in FIG. 18(o) to the 4-phase discriminating circuit 59. The 4-phase discriminating circuit 59 discriminates the current phase rotation on the basis of the phase difference data 58a, and supplies the discriminated data to the rotation correction signal generating circuit 60, in order to obtain the first rotation correction signal aa1 for leading the phase by 90 degrees and the second rotation correction signal aa2 for leading the phase by 180 degrees as the phase leading command signals.

Figure 6:
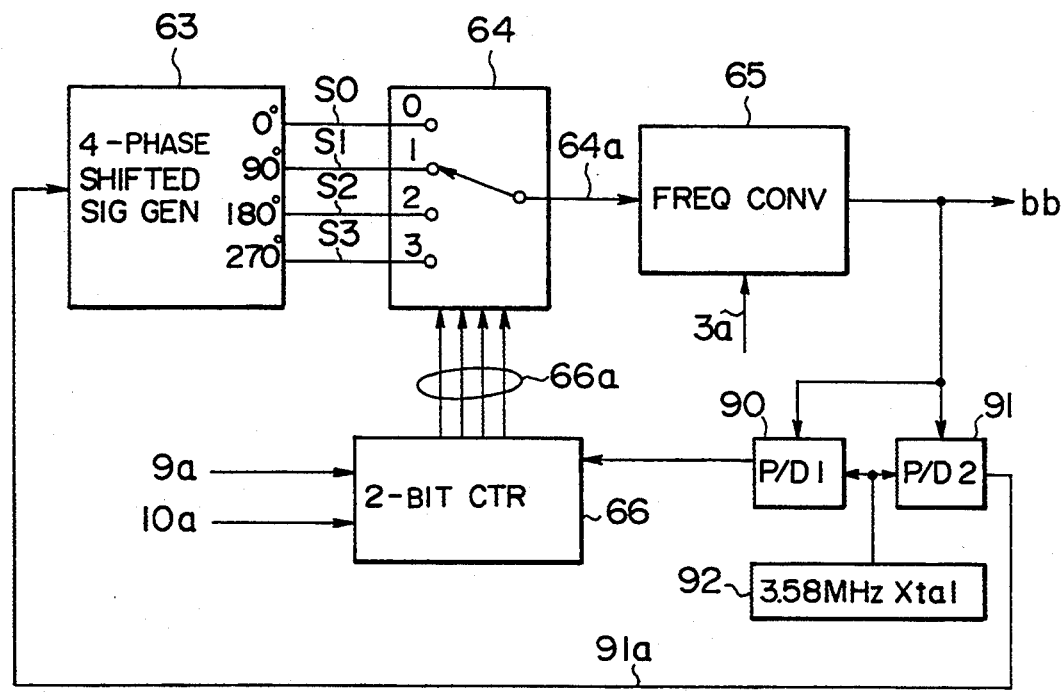
FIG. 6 is a block diagram showing the prior art color rotation processor BB.
Figure 19:
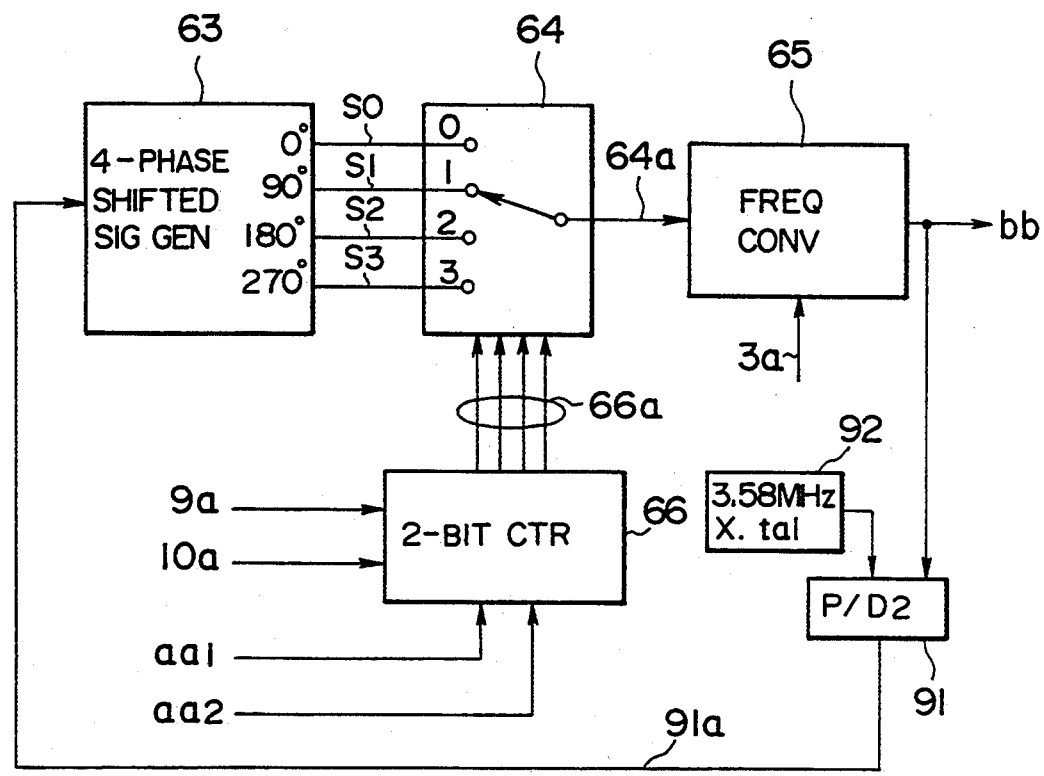
FIG. 19 is a block diagram showing a color rotation processor BB of the present invention.
Figure 20:
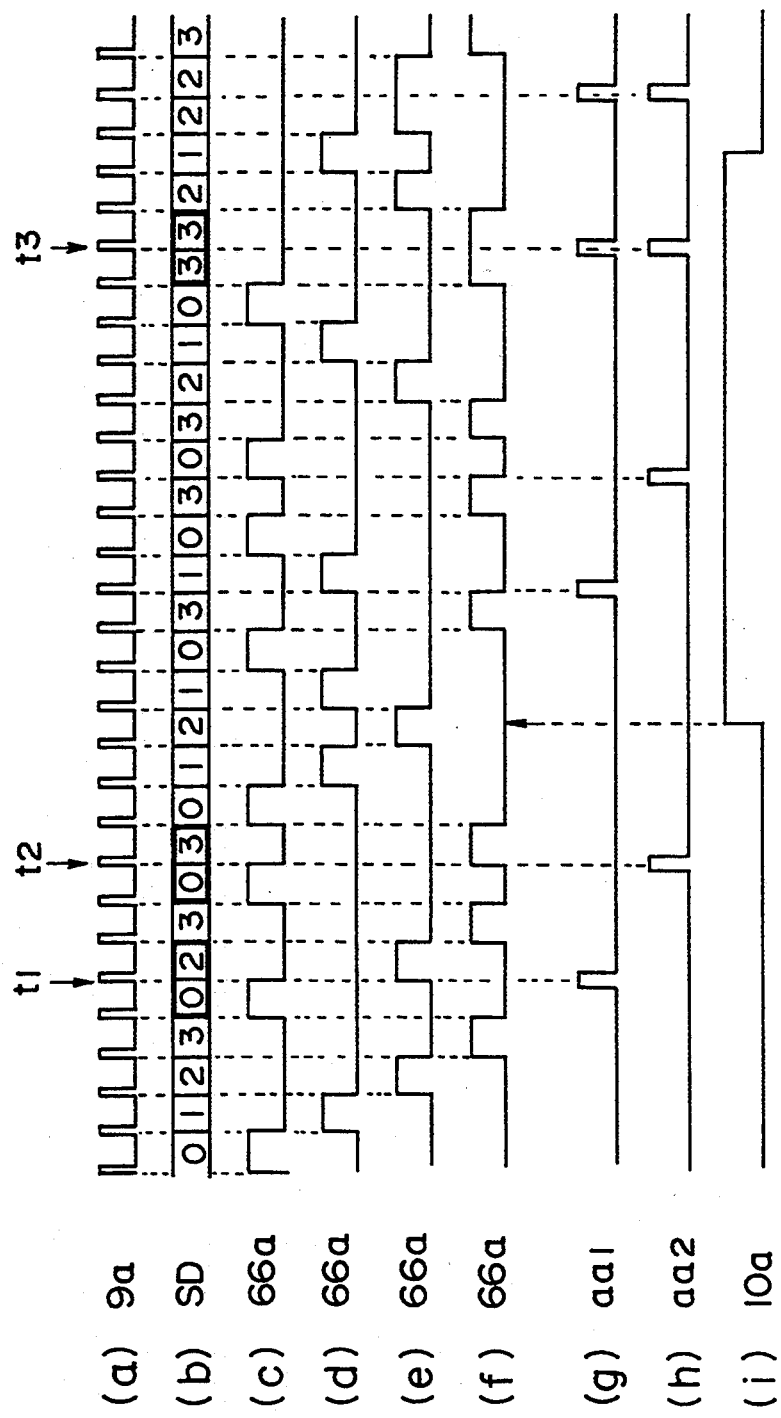
FIG. 20 is a timing chart for assistance in explaining the operation of the 2-bit counter circuit 66 shown in FIG. 19.
Figure 21:
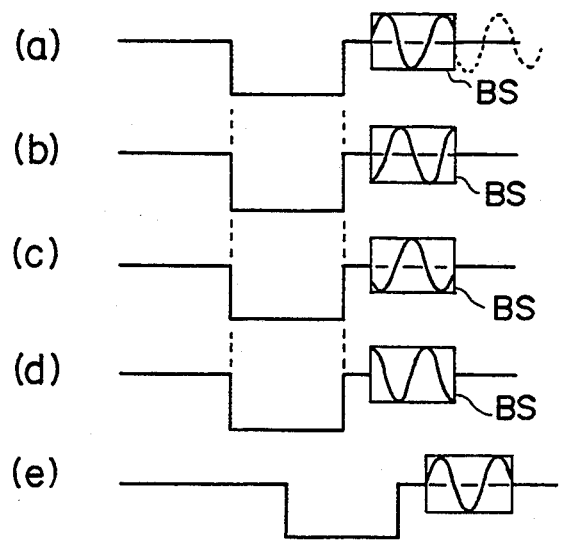
FIG. 21 is a timing chart for assistance in explaining an improvement in the APC color error by the time base correcting circuit.

The color rotation processor BB will be described hereinbelow with reference to FIGS. 19 and 20. The point different from the prior art color rotation processor BB shown in FIG. 6 is that in this embodiment there exists no feedback loop by use of the first phase comparing circuit 90. Therefore, the same reference numerals as in FIG. 6 have been retained for similar circuits which have the same functions, without repeating any detailed description thereof.

The frequency converting circuit 65 converts the reproduced low frequency-converted signal 3a into the high frequency-converted signal bb by multiplying the low frequency-converted signal 3a by the output signal 64a of the switching circuit 64. In this embodiment, the switching circuit 64 selects the output signal 64a obtained under consideration of the color rotation correction.

In more detail, the 4 phase-shifted signal generating circuit 63 supplies the first to fourth local oscillation signals S0 to S3 to the switching circuit 64. The local oscillation signals S0 to S3 used for high frequency conversion have a local frequency of 4.2 MHz and four different phases each shifted by 90 degrees with respect to each other. These first to fourth local oscillation signals S0 to S3 can be selected in response to four-bit data selection signals 66a applied from the 2-bit counting circuit 66 to the switching circuit 64. The selected signal is outputted as an output signal 64a to the frequency converting circuit 65.

The operation of the 2-bit counter circuit 66 will be described with reference to FIG. 20. The counter circuit 66 counts the horizontal synchronizing signals 9a as shown in FIG. 20(a) as the clock signal, and further adds or subtracts "1" or "2" to or from the ordinary counted value, respectively in response to the high level of the first or second rotation correction signals aa1 or aa2 (the command signals for leading the phase by 90 or 180 degrees) as shown in FIG. 20(g) or FIG. 20(h). The addition or subtraction operation of the 2-bit counter circuit 66 can be determined by the output signal 10a of the latch circuit 10 as shown in FIG. 20(i). That is, if the output signal 10a is at a low level, the addition operation is determined to be executed; and if at a high level, the subtraction operation is determined. FIG. 20(b) shows the counted value (selected data) of the 2-bit counter circuit 66 thus obtained; and FIG. 20(c) to FIG. 20(f) show the respective selected data 66a in the order of the LSB (least significant bit).

The timings t1 to t3 shown in FIG. 20 will be described in more practical way. First, at the timing t1, since the output signal 10a of the latch circuit 10 is at a low level, the operation is in addition status. Further, since the first rotation correction signal aa1 is at a high level, the selection data to be changed from "0" to "1" in the ordinary status is changed from "0" to "2" as shown by a left side thick box in FIG. 20(b). Further, at the timing t2, since the output signal 10a of the latch circuit 10 is at a low level, the operation is in addition status. Further, since the second rotation correction signal aa2 is at a high level, the selection data to be changed from "0" to "1" in the ordinary status is changed from "0" to "3" as shown by a middle thick box in FIG. 20(b). Further, at the timing t3, since the output signal 10a of the latch circuit 10 is at a high level, the operation is in subtraction status. Further, since the first and second rotation correction signals aa1 and aa2 are both at a high level, the selection data to be changed from "3" to "2" in the ordinary status is changed from "3" to "3" as shown by a right side thick box in FIG. 20(b), because "3" is further subtracted from "2".

As described above, since the phase rotation can be corrected for each 1H, it is possible to improve the color reproducibility during the high speed reproduction operation.

Here, there exists a problem in that a well-known APC loop for high-frequency conversion in the color rotation processor BB reveals a long pull-in time, which is caused by the discontinuity of the phase rotation produced when the magnetic heads are switched. The means for solving the above-mentioned problem will be described with reference to FIGS. 21 and 22.

For facilitate understanding of the operation, in FIG. 21(a) to FIG. 21(d), an ideal reproduced low frequency-converted chrominance signal 3a is shown together with the reproduced luminance signal 7a in the order of the horizontal lines, in which the phase of the burst signal in the reproduced low frequency-converted chrominance signal 3a sequentially lags behind by 90 degrees.

However, if there exists a skew, since the skew is generated in the reproduced low frequency-converted chrominance signal 3a in the same way as in the reproduced luminance signal 7a, as shown in FIG. 21(e), the APC loop operates erroneously.

Figure 22:
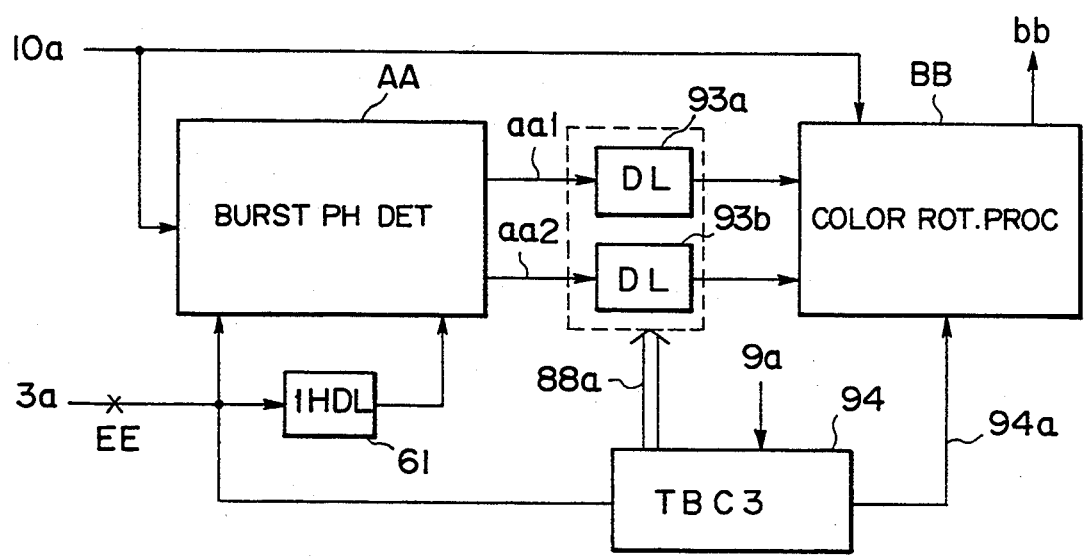
FIG. 22 is a block diagram showing the main portion of a chrominance signal reproducing circuit of the present invention.

To overcome this problem, in this embodiment, the main portion of a chrominance signal reproducing circuit as shown in FIG. 22 is used. The points different between the circuit shown in FIG. 16 and that shown in FIG. 22 are that variable delay circuits 93a and 93b and a third time base correcting circuit (TBC 3) are additionally incorporated. Therefore, the same reference numerals as in FIG. 16 have been retained for the same elements which have the same functions, without repeating any detailed description thereof.

In this circuit, after a skew has been removed from the reproduced low frequency-converted chrominance signal 3a by the third time base correcting circuit 94 on the basis of the horizontal synchronizing signal 9a, the reproduced low frequency-converted chrominance signal 3a is supplied, as the signal 94a, to the color rotation processor BB to obtain the high frequency-converted signal bb after the predetermined processing.

In the above-mentioned operation, a delay time is produced when the time base is corrected by the third time base correcting circuit 94. Therefore, it is necessary to delay the first and second color rotation correcting signals aa1 and aa2 also. The correcting signals are delayed by the variable delay circuit 93a and 93b. That is, the delay time of the variable delay circuits 93a and 93b are controlled automatically on the basis of the delay data 88a supplied from the third time base correcting circuit 94, in such a way as to be roughly equal to the delay time of the third time base correcting circuit 94. Further, since the APC loop operation can be more stabilized by correcting the time base through the third time base correcting circuit 94 before the high frequency conversion, it is possible to interpose the third time base correcting circuit 94 at the position shown by EE in FIG. 22, in order that the time base of the reproduced low frequency-converted chrominance signal 3a may be corrected before being supplied to the 1H delay circuit 61 and the burst phase detecting circuit AA. In this case, the variable delay circuits 93a and 93b are not required, thus it being possible to simplify the circuit configuration.

Figure 23:
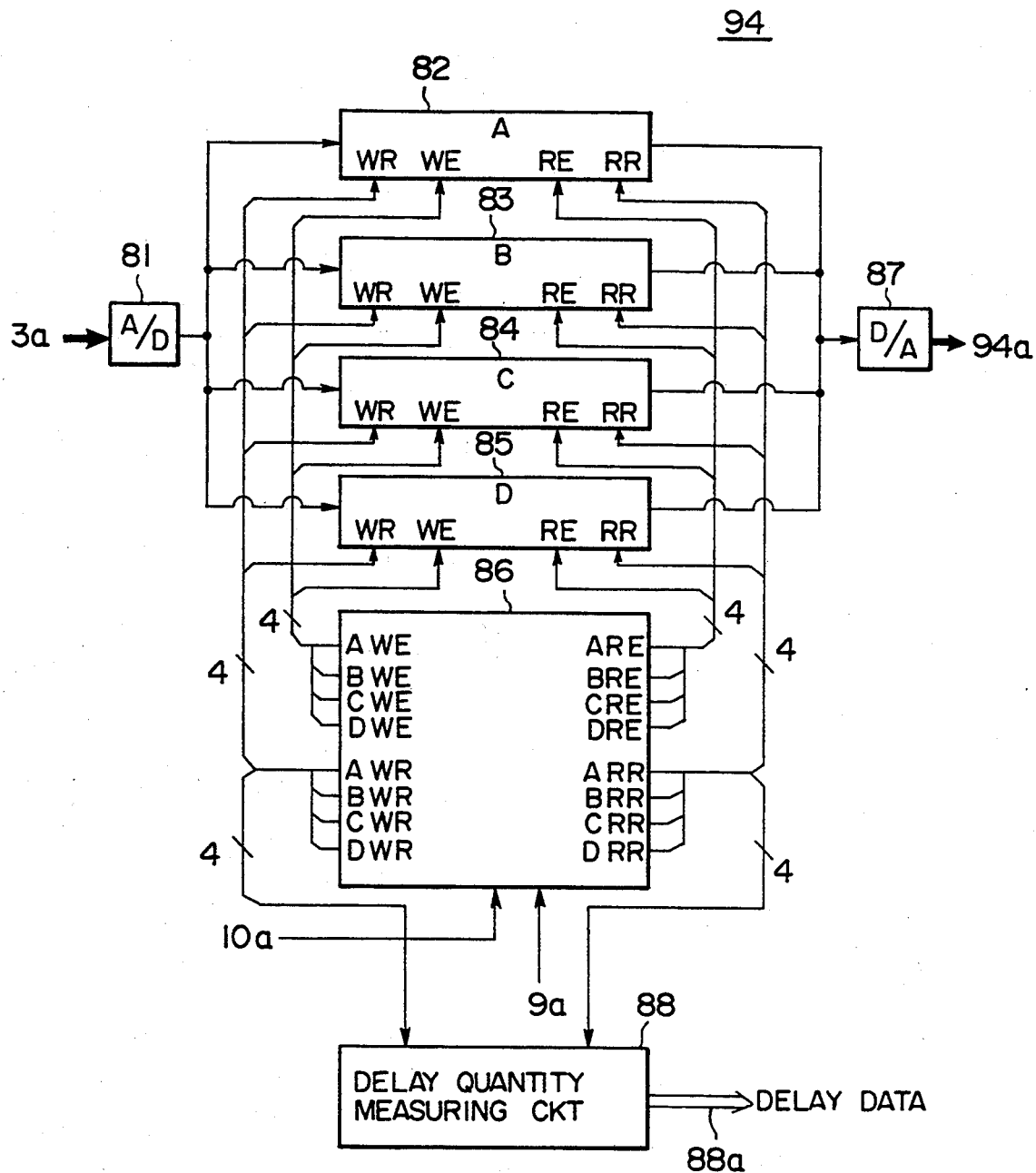
FIG. 23 is a block diagram showing the third time base correcting circuit 94 of the invention.

The third time base correction circuit 94 is shown in FIG. 23. The circuit 94 has the construction which includes a time base correction circuit the same as the second time base correction circuit 8 shown in FIG. 11 and a delay quantity measuring circuit 88. The constitution and the operation of the delay quantity measuring circuit 8 will be described with reference to FIGS. 24 and 25. The operation of the time base correction circuit portion in FIG. 23 is the same as that of the second time base correction circuit 8, the difference therebetween is the signal handled, that is, the chrominance signal 3a in FIG. 23, while the luminance signal 7a in FIG. 11. Thus, the explanation of the operation of the time base correction portion is omitted.

Figure 24:
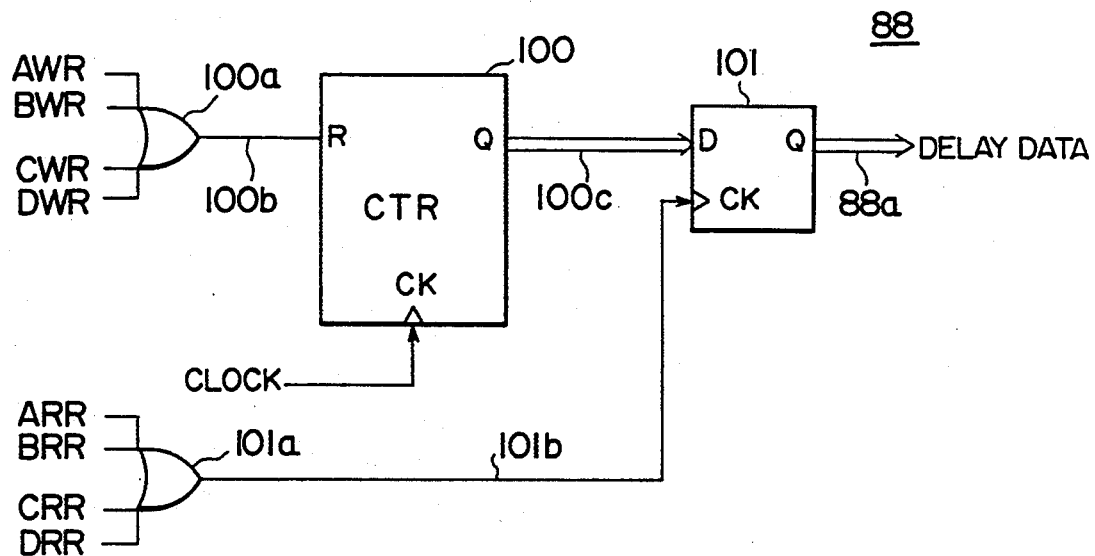
FIG. 24 is a block diagram showing a delay quantity measuring circuit 88 of the invention.
Figure 25:
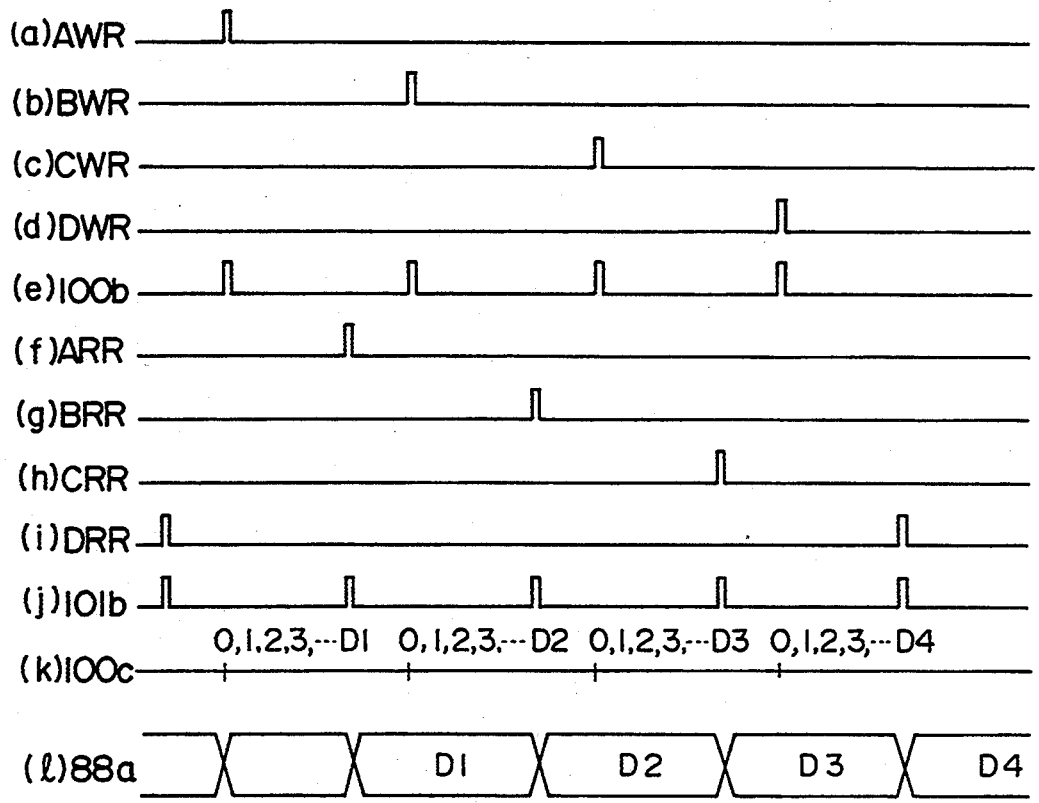
FIG. 25 is a timing chart for assistance in explaining the operation of the delay quantity measuring circuit 88.

In FIG. 24, the delay quantity measuring circuit 88 includes a counter 100, a latch 101, OR-gates 100a and 101a. One of the write reset signals AWR to DWR outputted from the memory control circuit 86 shown in FIG. 23 is applied to a reset terminal R of the counter 100, as a signal 100b via the OR-gate 100a. Output signals of Q terminals of the counter 100 are reset at the rising edge of the signal 100b, thus, the counter 100 starts to count clock signals applied to a clock terminal CK of the counter 100 from a clock signal generator (not shown).

Sequentially, one of the read reset signals ARR to DRR outputted from the memory control circuit 86 is applied to a clock terminal CK of the latch 101, as a signal 101b via the OR-gate 101a. Count value (100C of FIG. 25(k)) of the counter 100 is applied to D terminals of the latch 101, as data of m bits (m is a positive integer). The count values D1, D2, ..., Dn (n is a positive integer) of the counter 100 at respective timings when the signal 101b rises are sequentially latched to the latch 101. Each of the latched count values is outputted from Q terminals of the latch 101, as the delay data 88a, until the next count value is latched to the latch 101 as shown in FIG. 25(l).

The delay data 88a (D1, D2, ..., Dn) represents the number of pulses of the clock signal during the time period from the incoming of the write reset signals AWR to DWR to the incoming of the read reset signals ARR to DRR to the delay quantity measuring circuit 88. In other words, the delay data 88a represents the time period of the delay time in which the chrominance signal is delayed by the line memories A to D, by the number of the pulses of the clock signal.

Figure 26:
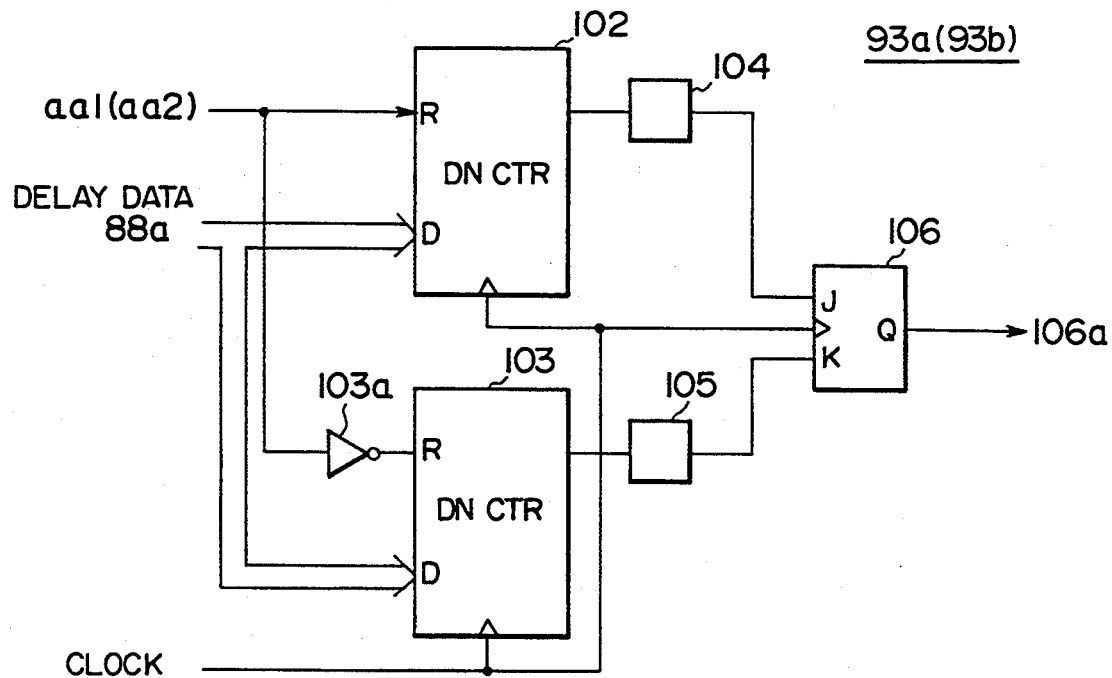
FIG. 26 is a block diagram showing a variable delay circuit 93a (93b) of the invention.
Figure 27:
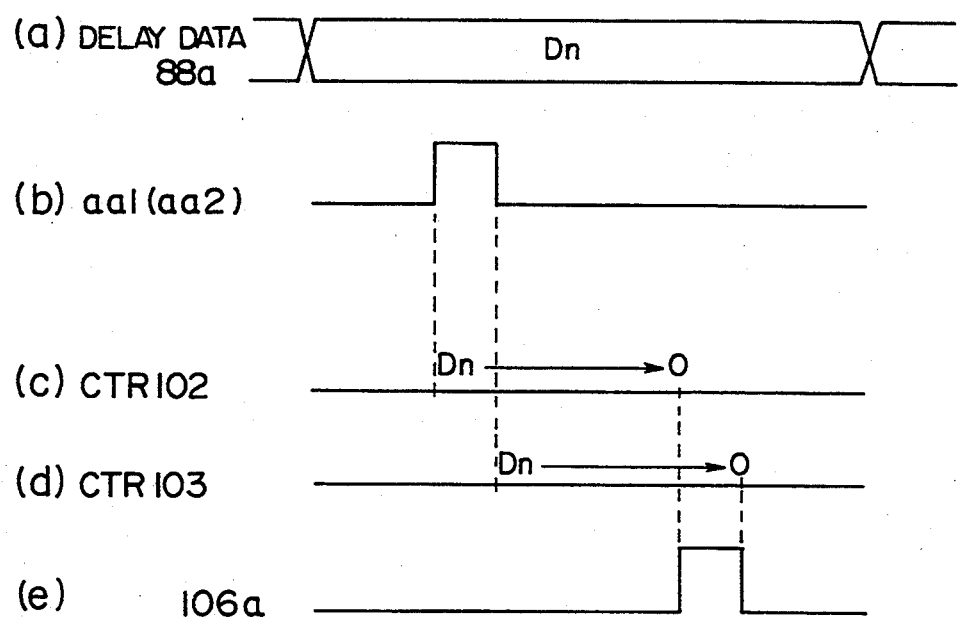
FIG. 27 is a timing chart for assistance in explaining the operation of the variable delay circuit 93a (93b)

The constitution and the operation of each of the variable delay circuits 93a and 93b as shown in FIG. 22 will be described with reference to FIGS. 26 and 27. The variable delay circuits 93a and 93b are composed of the same circuitry and operate in the same way. In FIG. 26, each of the variable delay circuits 93a and 93b includes down counters 102 and 103, decoders 104 and 105, a J-K flip-flop 106 and an inverter 103a.

The delay data 88a is applied to both data input terminals D of the down counters 102 and 103. The color rotation correction signal aa1 (aa2) is directly applied to a reset terminal R of the down counter 102 and also applied to that of the down counter 103 via the inverter 103a. The decoders 104 and 105 apply pulse signals to J and K terminal of the J-K flip-flop 106, respectively when detecting the respective count values becoming zero.

More in detail, to the down counters 102 and 103 and also the flip-flop 106, a clock signal of stable frequency is applied from a clock signal generator (not shown). Each of the counters 102 and 103 accepts the delay data 88a applied to the data input terminals D in response to the rising edge of the color rotation correction signal aa1 (aa2) applied to the reset terminal R.

In detail, the down counter 102 accepts the delay data 88a or Dn (n=1, 2, 3, ...) applied to the data input terminals D in response to the rising edge of the color rotation correction signal aa1 (aa2) and starts down-counting according to the clock signal. The counted value of the down-counting is applied to the decoder 104 which applies a plus signal to the J-terminal of the flip-flop 106 when the counted value becomes zero. Thus, an output signal 106a from the Q-terminal of the flip-flop 106 is raised to a high level.

On the other hand, the down counter 103 accepts the delay data 88a or Dn (n=1, 2, 3, ...) applied to the data input terminals D in response to the falling edge of the color rotation correction signal aa1 (aa2), because the signal aa1 (aa2) is applied to the input terminals D via the inverter 103a. The down counter 103 then starts down-counting according to the clock signal. The counted value of the down-counting is applied to the decoder 105 which applies a plus signal to the K-terminal of the flip-flop 106 when the counted value becomes zero. Thus, the output signal 106a from the Q-terminal of the flip-flop 106 is thrown back to a low level.

Accordingly, the color rotation correction signal aa1 (aa2) is delayed by the time period corresponding to the delay data 88a and outputted from the flip-flop 106 as the signal 106a.

As described above, in this embodiment, since the color rotation is corrected on the basis of the reproduced low frequency-converted signal from which a skew has been removed, it is possible to obtain an excellent high frequency-converted signal bb without disturbing the APC loop operation.

Fourth embodiment

In the above-mentioned third embodiment, the discontinuity of the color rotation caused when the magnetic heads are switched is corrected by detecting the phase of the burst signal. However, since the burst signal is a signal converted to a low frequency range, it is difficult to decrease the crosstalk interference due to azimuth loss and therefore there exists a case where an error increases in detecting the burst signal phase. To overcome this problem, in this fourth embodiment, the burst signal converted to the low frequency range is passed through a comb-type filter to improve the precision of when the phase is detected.

Figure 28:
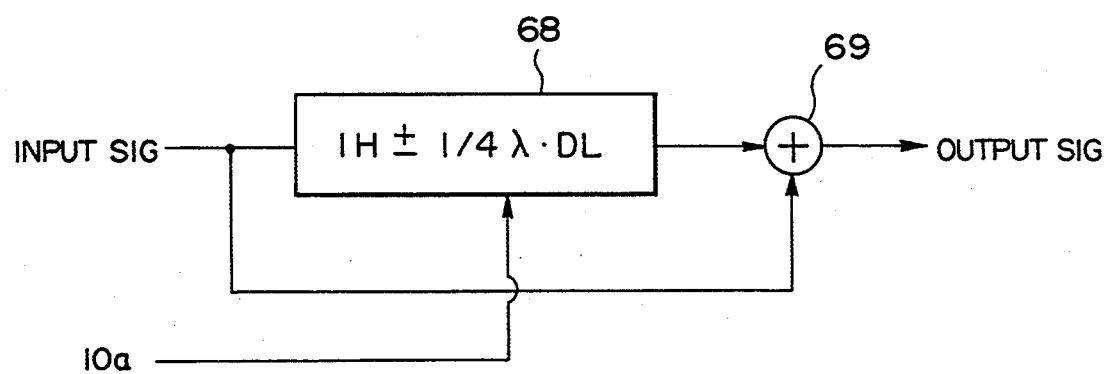
FIG. 28 is a block diagram showing a comb-type filter of the fourth embodiment of the present invention.

The comb-type filter incorporated in this fourth embodiment is shown in FIG. 28. The comb-type filter is composed of a delay circuit (1H±¼λDL) 68 and an adder circuit 69. The delay time of the delay circuit 68 is controlled on the basis of the output signal 10a of the latch circuit 10 as shown in FIG. 7 in corresponding to the forward and reverse phase shift of the burst signal. That is, when the signal 10a is at a low level, the delay time is set to 1H−¼λ; and when at a high level, the delay time is set to 1H+¼λ. Therefore, the input signal and the output signal of the delay circuit 68 match each other in phase. These two input and output signals are added by the adder circuit 69, so that it is possible to obtain an output signal having an emphasized signal component effective against the crosstalk components.

The above-mentioned comb-type filter is interposed between the A/D converting circuit 50 and the filter circuit 51 or between the filter circuit 51 and the binarizing circuit 52 in the circuit shown in FIG. 17, in order to reduce the crosstalk interference, thus it being possible to more accurately detect the phase of the burst signal.

As described above, in the configuration of the present invention, since, when the discontinuity of the phase rotation caused by the switching of the first and second magnetic heads is detected by the phase detection means, the phase is shifted by the reproduced chrominance processing means to restore the phase rotation at recording, it is possible to correct the deviation of the phase caused by the switching in an open loop, without disturbing the chrominance signal in the horizontal lines immediately after the first and second magnetic heads have been switched, thus resulting in such an effect that it is possible to provide a magnetic video signal reproducing apparatus excellent in the high speed reproduction operation, in particular.

Furthermore, as described above, in the configuration of the present invention, since the time base is corrected by the time base correcting means before the reproduced low frequency-converted chrominance signal is converted into the high frequency range, it is possible to improve the pull-in time of the APC loop used for the high frequency conversion by the reproduced chrominance signal processing means, without disturbing the chrominance signal in the horizontal lines immediately after the first and second magnetic heads have been switched, thus resulting in such an effect that it is possible to provide a magnetic video signal reproducing apparatus excellent in the high speed reproduction operation, in particular.

What is claimed is:

1. An apparatus for reproducing a video signal having a first video signal portion and a second video signal portion from a magnetic recording medium using a first magnetic head and a second magnetic head having mutually different azimuth angles, the first and second video signal portions being reproduced by the first and second magnetic heads, respectively, the video signal being obtained by frequency-multiplexing of a low frequency-converted chrominance signal which is obtained by conversion into a low frequency range and a first phase rotation of a chrominance signal per horizontal scanning period, and a modulated luminance signal, the apparatus comprising:

switching means for selecting one of the first and second video signal portions picked up by the first and second magnetic heads to obtain a sequence of reproduced video signal portions containing said low-frequency-converted chrominance signal;

color reproduction processing means for reconverting the low frequency-converted chrominance signal in the sequence of reproduced video signal portions into a high frequency range chrominance signal and applying a second phase rotation which is substantially opposite to the first phase rotation, to the low frequency-converted chrominance signal;

phase detection means for detecting discontinuity in the first phase rotation of the low frequency-converted chrominance signal in the frequence of reproduced video signal portions;

wherein the color reproduction processing means forcibly corrects the second phase rotation of the low frequency-converted chrominance signal contained in the frequence of reproduced video signal portions by applying the second phase rotation to the low frequency-converted chrominance signal in a substantially opposite direction of the first phase rotation in response to detection of discontinuity in the first phase rotation.

2. An apparatus according to claim 1, further comprising time base corrector means for correcting a time base of the low frequency-converted chrominance signal before the low frequency-converted chrominance signal is applied to the color reproduction processing means.

* * * * *